(12) United States Patent
Romers

(10) Patent No.: US 11,247,148 B2
(45) Date of Patent: Feb. 15, 2022

(54) FILTER BACKWASH CONTROL SYSTEM FOR A WATER OR WASTEWATER TREATMENT SYSTEM TO CONSERVE WATER DURING THE FILTER BACKWASH PROCESS

(71) Applicant: Mark W. Romers, Sandston, VA (US)

(72) Inventor: Mark W. Romers, Sandston, VA (US)

( * ) Notice: Subject to any disclaimer, the term of this patent is extended or adjusted under 35 U.S.C. 154(b) by 0 days.

(21) Appl. No.: 17/223,678

(22) Filed: Apr. 6, 2021

(65) Prior Publication Data
US 2021/0220759 A1 Jul. 22, 2021

Related U.S. Application Data

(63) Continuation of application No. 15/916,273, filed on Mar. 8, 2018, now Pat. No. 10,967,303.
(Continued)

(51) Int. Cl.
*B01D 24/46* (2006.01)
*C02F 1/00* (2006.01)
(Continued)

(52) U.S. Cl.
CPC ......... *B01D 24/4631* (2013.01); *B01D 24/20* (2013.01); *B01D 37/041* (2013.01);
(Continued)

(58) Field of Classification Search
CPC .......... C02F 1/283; C02F 1/008; C02F 1/001; C02F 2209/11; C02F 2209/42;
(Continued)

(56) References Cited

U.S. PATENT DOCUMENTS

| 4,568,465 A | 2/1986 | Davis et al. |
| 4,986,905 A | 1/1991 | White |

(Continued)

FOREIGN PATENT DOCUMENTS

| DE | 19502499 | 8/1996 |
| DE | 19814102 | 5/1999 |

(Continued)

OTHER PUBLICATIONS

Werner R. Kriesel, Otto W. Madelung, AS-Interface The Actuator-Sensor-Interface for Automation, (1999), 110 pages, Carl Hanser Verlag Munchen Wien, Germany.
(Continued)

*Primary Examiner* — Dirk R Bass
(74) *Attorney, Agent, or Firm* — Greenberg Traurig, LLP; Dwayne L. Mason; Matthew Browning

(57) ABSTRACT

A water treatment filter backwash process control system, comprising a control system that receives filter level data and filter backwash turbidity data. The control system having a filter level set point, wherein the filter level set point corresponds to a desired filter media bed expansion. The control system having a filter backwash turbidity set point, wherein the control system controls the filter backwash process by, while monitoring the filter backwash turbidity, sending one or more output signals that are used to control a backwash inlet liquid flow in order to maintain a desired media bed expansion, and stop the backwash inlet liquid flow when the filter backwash turbidity set point is reached.

11 Claims, 8 Drawing Sheets

Water Treatment Filter System while Filtering Water

Related U.S. Application Data

(60) Provisional application No. 62/468,772, filed on Mar. 8, 2017.

(51) Int. Cl.
   *B01D 24/20* (2006.01)
   *B01D 37/04* (2006.01)
   *C02F 103/00* (2006.01)

(52) U.S. Cl.
   CPC .......... *B01D 37/045* (2013.01); *C02F 1/001* (2013.01); *C02F 1/004* (2013.01); *C02F 1/008* (2013.01); *C02F 2103/007* (2013.01); *C02F 2209/003* (2013.01); *C02F 2209/11* (2013.01); *C02F 2209/40* (2013.01); *C02F 2209/42* (2013.01); *C02F 2303/16* (2013.01)

(58) Field of Classification Search
   CPC ............. C02F 2303/16; C02F 1/004; C02F 2103/007; C02F 2209/003; C02F 2209/40; C02F 2201/005; C02F 2209/005; F16K 11/07; F16K 31/426; G05D 7/0641; B01D 24/20; B01D 24/4631; B01D 37/041; B01D 37/045
   See application file for complete search history.

(56) References Cited

U.S. PATENT DOCUMENTS

| | | | |
|---|---|---|---|
| 5,038,318 | A | 8/1991 | Roseman |
| 5,351,199 | A | 9/1994 | Ticcioni et al. |
| 5,828,851 | A | 10/1998 | Nixon et al. |
| 5,841,654 | A | 11/1998 | Verissimo et al. |
| 5,896,290 | A | 4/1999 | Katsuta et al. |
| 5,940,294 | A | 8/1999 | Dove |
| 5,947,689 | A | 9/1999 | Schick |
| 5,955,859 | A | 9/1999 | Baurand et al. |
| 5,978,193 | A | 11/1999 | Kaaden |
| 5,995,916 | A | 11/1999 | Nixon et al. |
| 6,026,352 | A | 2/2000 | Burns et al. |
| 6,035,240 | A | 3/2000 | Moorehead et al. |
| 6,047,222 | A | 4/2000 | Burns et al. |
| 6,067,477 | A | 5/2000 | Wewalaarachchi et al. |
| 6,115,713 | A | 9/2000 | Pascucci et al. |
| 6,127,748 | A | 10/2000 | Girard et al. |
| 6,173,731 | B1 | 1/2001 | Ottliczky |
| 6,206,042 | B1 | 3/2001 | Channell et al. |
| 6,210,580 | B1 | 4/2001 | Wickins |
| 6,222,441 | B1 | 4/2001 | Siegwarth |
| 6,235,200 | B1 | 5/2001 | Mace |
| 6,285,912 | B1 | 9/2001 | Ellison et al. |
| 6,285,966 | B1 | 9/2001 | Brown et al. |
| 6,289,787 | B1 | 9/2001 | Underwood et al. |
| 6,294,889 | B1 | 9/2001 | Briant et al. |
| 6,304,934 | B1 | 10/2001 | Pimenta et al. |
| 6,332,327 | B1 | 12/2001 | Street et al. |
| 6,378,574 | B2 | 4/2002 | Tsutsui |
| 6,422,263 | B1 | 7/2002 | Spicer |
| 6,449,715 | B1 | 9/2002 | Krivoshein |
| 6,458,268 | B1 | 10/2002 | Grandprey et al. |
| 6,564,242 | B1 | 5/2003 | Bonet et al. |
| 6,569,335 | B1 | 5/2003 | Johnson |
| 6,601,005 | B1 | 7/2003 | Eryurek et al. |
| 6,647,315 | B1 | 11/2003 | Sherriff et al. |
| 6,687,698 | B1 | 2/2004 | Nixon et al. |
| 6,691,604 | B1 | 2/2004 | Hajek et al. |
| 6,701,225 | B1 | 3/2004 | Schenk et al. |
| 6,704,737 | B1 | 3/2004 | Nixon et al. |
| 7,319,921 | B2 | 1/2008 | Underwood et al. |
| 10,286,337 | B1 | 5/2019 | Romers |
| 10,967,303 | B2 | 4/2021 | Romers |
| 2002/0050297 | A1 | 5/2002 | Timney |
| 2002/0087244 | A1 | 7/2002 | Dix et al. |
| 2002/0119249 | A1 | 8/2002 | Kevin |
| 2003/0018590 | A1 | 1/2003 | Bar |
| 2003/0019297 | A1 | 1/2003 | Fiebelkorn et al. |
| 2003/0030537 | A1 | 2/2003 | Kogure |
| 2003/0083756 | A1 | 5/2003 | Hsiung et al. |
| 2003/0109951 | A1 | 6/2003 | Hsiung et al. |
| 2003/0144746 | A1 | 7/2003 | Hsiung et al. |
| 2003/0220717 | A1 | 11/2003 | Underwood et al. |
| 2004/0020870 | A1 | 2/2004 | Amburgey, Jr. |
| 2004/0153594 | A1 | 8/2004 | Rotvold et al. |
| 2005/0007249 | A1 | 1/2005 | Eryurek et al. |
| 2005/0010307 | A1 | 1/2005 | Dove et al. |
| 2005/0012608 | A1 | 1/2005 | Havekost et al. |
| 2005/0033466 | A1 | 2/2005 | Eryurek et al. |
| 2006/0078710 | A1 | 4/2006 | Lin |
| 2008/0078710 | A1 | 4/2008 | Larkner |
| 2009/0165866 | A1 | 7/2009 | Fima |
| 2016/0332901 | A1 | 11/2016 | Matsui |
| 2019/0275448 | A1 | 9/2019 | Ramers |

FOREIGN PATENT DOCUMENTS

| | | |
|---|---|---|
| DE | 19734694 | 7/2011 |
| EP | 1312991 | 3/2007 |
| WO | 2018/165490 | 9/2018 |

OTHER PUBLICATIONS

James E. Amburgey, Appiah Amirtharajah, Barbara M. Brouckaert, and Neal C. Spivey. "An Enhanced Backwashing Technique for Improved Filter Ripening", Journal AWWA, Dec. 2003, pp. 81-94.

Entech Design, Inc., "Optimize Filter Cleaning Through Echo Smart—Interface Level Analyzer"; 2 pages.

Partnership for Safe Water, "Working Together to Protect Pubilc Health by Optimizing Water System Operations"; 2 pages.

Power Presentation, "Approaches to Filter Condition Assessment and Optimization", NC AWWA-WEA Annual Conference, Nov. 18, 2014, 36 pages, Winston Salem, NC.

Engelhardt, Terry L., Hach Company, (2008) "Using Turbidimeters to Monitor Backwash"; 7 pages.

Hach Company, Jul. 2005, "Application Note 126 Defining Drinking Water Plant Backwash Profile Using the SOLITAX™ sc Suspended Solids and Turbidity Sensor", JAS 7/05 3ed; 10 pages.

PCT International Searching Authority, International Search Report and Written Opinion dated May 8, 2018 for PCT International Application No. PCT/US2018/021635 filed Mar. 8, 2018; 37 pages.

The International Bureau of WIPO; PCT International Preliminary Report on Patentability, issued in connection to PCT/US2018/021635; Sep. 10, 2019; 32 pages; Switzerland.

Canadian Intellectual Property Office; Examiner Report, issued in connection with patent application No. 3055568; Nov. 4, 2020; 8 pages; Canada.

Canadian Intellectual Property Office; Examiner Report, issued in connection with patent application No. 3055568; Jun. 11, 2021; 5 pages; Canada.

European Patent Office; Extended European Search Report, issued in connection to application No. 18763991.9; Feb. 24, 2021; 10 pages; Europe.

Mexican Institute of Industrial Property; Office Action, issued in connection with patent application No. MX/a/2019/010688; May 4, 2021; 12 pages; Mexico.

ents of the present invention use filter media bed expansion and filter tank backwash turbidity to conserve water by reducing the amount of water utilized during the filter backwash process.

FILTER BACKWASH CONTROL SYSTEM FOR A WATER OR WASTEWATER TREATMENT SYSTEM TO CONSERVE WATER DURING THE FILTER BACKWASH PROCESS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates generally to a filter backwash control system and method in a water treatment plant. More particularly, but not by way of limitation, embodiments of the present invention use filter media bed expansion and filter tank backwash turbidity to conserve water by reducing the amount of water utilized during the filter backwash process.

BACKGROUND OF THE INVENTION

Surface water, such as lake, stream, canal or river water, or subterranean water, are generally treated in water treatment plants to prepare the water for use as drinking or potable water for human consumption or use, including coagulation, sedimentation, filtration and disinfection processes. This raw or pre-treated water often contains bacteria, pathogens, organic and inorganic substances that can cause a bad taste or odor, or is otherwise not safe for human consumption. For example, the water may contain organic substances from decaying vegetation, or chemicals from various agricultural or industrial applications, such as pesticides and herbicides. These water treatment plants utilize filtration systems to remove suspended solids from the water prior to it being delivered to the end consumer.

Many wastewater treatment plants include a final stage of wastewater treatment usually referred to as a tertiary surface water gravity filter system to prepare the wastewater before returning to the general environment including rivers, lakes, streams or the ocean or for human non-potable reuse purposes such as watering golf courses, lawns and public areas. This final treatment of the wastewater removes suspended solids from the water prior to it reaching the wetwell, a finished wastewater storage area in the wastewater water plant, before ultimately being delivered to the environment.

These filtration or filter systems can be single, dual or multi-media filters that are designed and built in all types of physical configurations which allow water to flow thru the filter by gravity. The filter systems are designed so that the media in the filters catch sufficient suspended solids in the water as it flows thru the media to reduce the filter effluent (i.e. the water coming out of the filter) turbidity to a predetermined acceptable level (e.g., for human consumption or to be returned to the environment). Over time, the captured suspended solids in the filter's media starts to clog the filter reducing the performance and flow of water out of the filter. Once the filter's performance is reduced to a predetermined low level, the filter must be backwashed to clean them and return them to service for maximum performance. This phenomenon is measured in various ways including increasing filter effluent turbidity, increasing filter headloss, increasing filter level, and a predetermined time duration. If any of these events occur, the filter must be backwashed to return it to maximum performance.

The filters need to be backwashed periodically, sometimes as much as two (2) to three (3) times per week depending on water effluent quality conditions. During the backwash procedure, the treated water used to clean the filter is routed to a wastewater treatment system in the plant such as a clarifier, lagoon, pond and or pumped back to the head of the plant. Typically, this filter backwash wastewater is sent to the treatment plant's wastewater treatment system for processing, treatment and removal. The excess backwash water wasted can be substantial and worth a significant amount of money and reduced production to the treatment plant. Thus, optimizing a filter backwash system's performance can reduce the amount of filter backwash wastewater used during the backwash process thereby increasing plant water production and decreasing plant wastewater treatment while saving money.

BRIEF SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, an apparatus, system and method for a water treatment filter backwash process, utilizing filter media level data to monitor the filter's media bed expansion during the backwash and filter tank backwash turbidity data to monitor the filter tank's backwash waste turbidity during the backwash to control and optimize the filter backwash process.

The water treatment filter backwash process includes controlling the high-wash backwash supply flow rate to maintain a desired filter media bed expansion and terminating the high-wash backwash supply flow when a predetermined filter tank backwash turbidity is reached. For example, in one aspect, control of the backwash water supply flow can include sending a variable output signal to a backwash supply flow control valve, wherein adjusting the output signal causes the valve to move from the open or closed positions in percentage increments (e.g., 20%, 45%, 75% open/close) to achieve or maintain a desired media bed expansion. Similarly, control of the backwash supply flow can include sending a variable output signal to a variable frequency drive (VFD) that is operatively connected to a motor to control the output of a pump that supplies the backwash supply water flow to achieve or maintain a desired media bed expansion. In another aspect, stopping the high-wash backwash supply flow when a desired filter tank backwash turbidity is reached can be achieved by for example, sending an output signal to the backwash supply flow control valve that causes the valve to close completely (i.e. 100% closed) or sending an output signal to the VFD or motor, which causes the backwash supply flow pump to stop, terminating the backwash step. In a further aspect, stopping the high-wash backwash supply flow when a desired filter tank backwash turbidity is reached can be achieved by for example, sending an output signal to a backwash supply flow control valve, wherein the valve is configured to be a fully open/fully closed valve, as opposed to a variable position control valve terminating the backwash step. In another embodiment, during the first low-wash backwash procedure the control system maintains a predetermined filter bed media expansion and terminates the low-wash backwash procedure when the filter tank turbidity reaches a predetermined setpoint.

In a further aspect, the apparatus, system and method for a water treatment filter backwash process is used in combination with a filter control system that utilizes a control system, such as a DCS, PLC, SCADA, or wireless control system (e.g., wireless instrumentation and control devices that communicate in over a wireless network, including those that implement industry standards, such as the WirelessHART or HART 7 standard), or a combination of these types of control systems that are operatively in communication with the various instrumentation, actuators and valves of the filter control system and are used to monitor and control the operation of water filter system, including a backwash system and method in accordance with an embodiment of the present invention.

In a further aspect, the apparatus, system and method for a water treatment filter backwash process is used in combination with a filter control system that utilizes a communication bus for controlling and monitoring water flow within the water treatment filter system, wherein the communication bus comprises a two-wire AS-I network in a loop and or star configuration coupling various instrumentation, actuators and valves to the filter control system.

In a further aspect, the apparatus, system and method for a water treatment filter backwash process is used in combination with a filter control system, wherein the actuators that facilitate the movement of the valves from an open to a close position may be a vane-type pneumatic actuator, cylinder-type pneumatic actuator, hydraulic-type actuator, or electric-type actuator.

BRIEF DESCRIPTION OF THE DRAWING

For a more complete understanding of this disclosure, reference is now made to the following brief description, taken in connection with the accompanying drawings and detailed description, wherein like reference numerals represent like parts.

Figure 1:
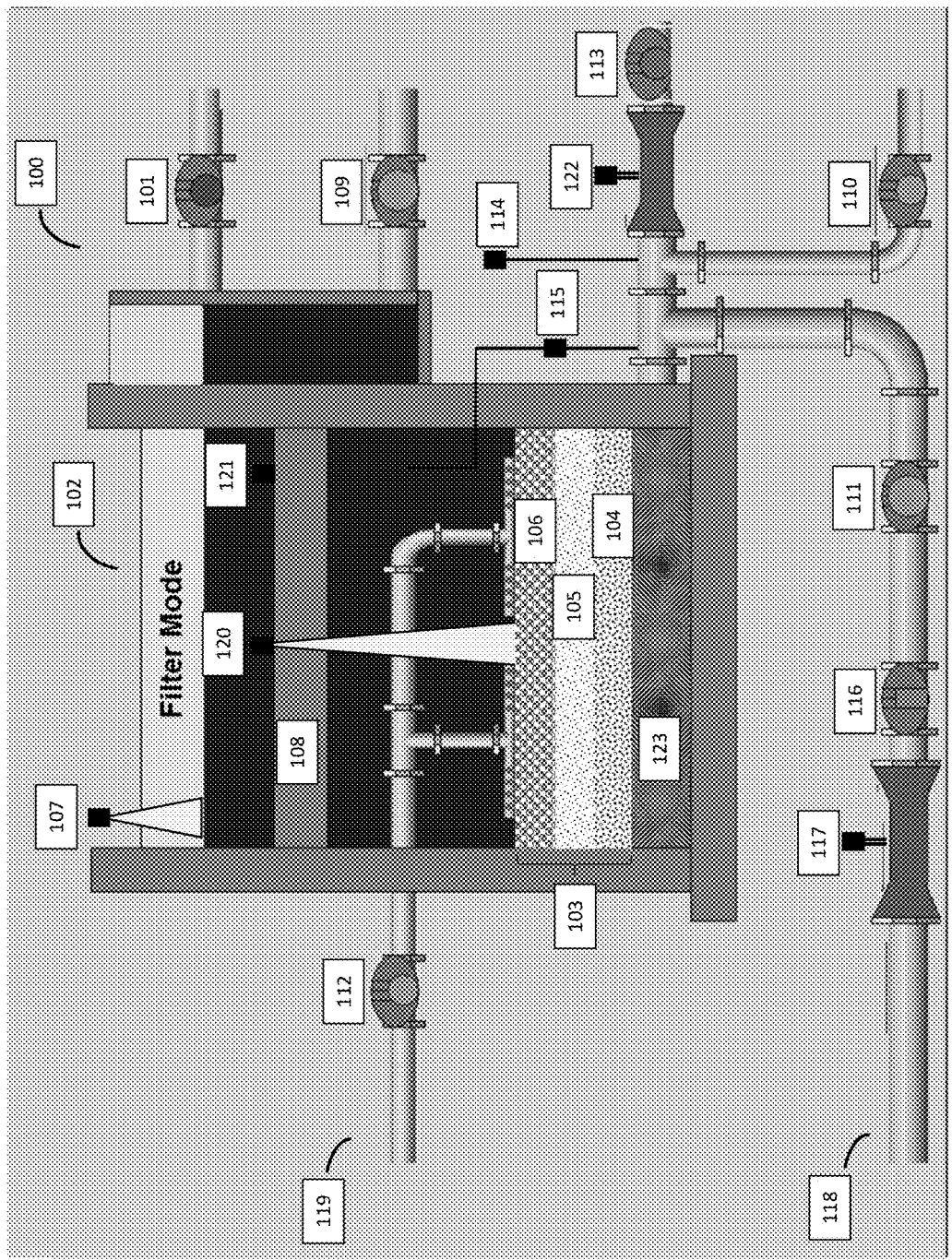
FIG. 1 depicts a water treatment filter system while filtering water.

While certain embodiments will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention as defined by claims. In the drawing figures, which are not to scale, the same reference numerals are used throughout the description and in the drawing figures for components and elements having the same structure, purpose or function.

DETAILED DESCRIPTION

Turning now to the detailed description of the preferred arrangement or arrangements of various embodiments of the present invention, it should be understood that, although an illustrative implementation of one or more embodiments are provided below, the inventive features and concepts may be manifested in other arrangements and that the scope of the invention is not limited to the embodiments described or illustrated. The various specific embodiments may be implemented using any number of techniques known by persons of ordinary skill in the art. The disclosure should in no way be limited to the illustrative embodiments, drawings, and/or techniques illustrated below, including the exemplary designs and implementations illustrated and described herein. The scope of the invention is intended only to be limited by the scope of the claims that follow. Furthermore, the disclosure may be modified within the scope of the appended claims along with their full scope of equivalents.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

The present disclosure will now be described more fully hereinafter with reference to the accompanying figures and drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 3:
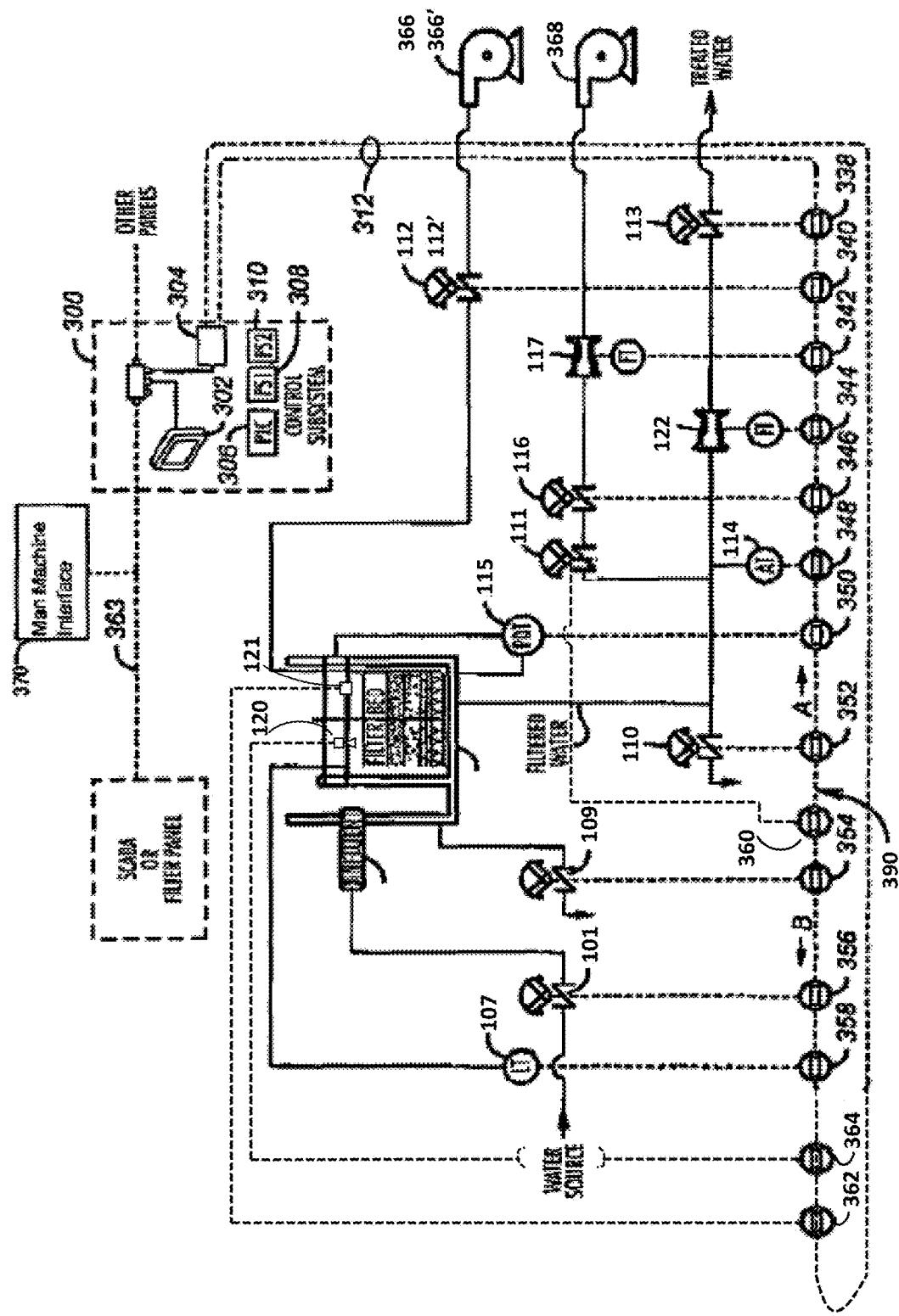
FIG. 3 depicts a water treatment filter control system diagram with related interfaces, instrumentation valves and actuators, wherein the instrumentation, valves and actuators are connected over a two-wire communication bus.

FIG. 1 depicts a schematic diagram of a water treatment filter system 100 during the process of filtering water that includes a filter backwash system and method in a filter backwash process control system in accordance with an embodiment of the present invention. The instrumentation, components, operation, and configuration of a filter and filter backwash system in accordance with embodiments of the present invention is described in detail below. While FIG. 1 depicts the filter system 100 and its associated instrumentation, and valves, FIG. 3 shows the various instrumentation, actuators and valves of the filter system 100 operatively in communication with a control system 300, such as a DCS, PLC, SCADA, or wireless control system (e.g., wireless instrumentation and control devices that communicate in over a wireless network, including those that implement industry standards, such as the WirelessHART or HART 7 standard), or a combination of these types of control systems that are used to monitor and control the operation of water filter system, including a backwash system and method in accordance with an embodiment of the present invention. Further, communication and connection of the various instrumentation, actuators and valves with the control system, can also include a communication bus for controlling and monitoring the various instrumentation, actuators and valves within the water filter system, wherein the communication bus comprises an Actuator Sensor-Interface (AS-I) two-wire network in a loop and or star configuration coupling various instrumentation, actuators and valves to the filter control system, such as depicted in FIG. 3. Further, the actuators that facilitate the movement of the valves from an open to a close position may be a vane-type pneumatic actuator, cylinder-type pneumatic actuator, hydraulic-type actuator, or electric-type actuator.

For example, in reference to FIG. 1, the flow of water through the water filter system is monitored by instrumentation and controlled by valves and piping and is typically operated by allowing water to flow through the filter by gravity (non-pressurized) thru multimedia (e.g. anthracite, sand and gravel), then thru the filter bottom into a collection gullet and finally out of the filter through an effluent flow control valve into a water plant well, such as a clearwell or a wastewater plant wetwell. The process of treating water for use or reuse includes first flowing through an influent valve 101 prior to entry into a filter 102. The filter 102 can include various media to eliminate certain undesirable elements from the pre-treated water. For instance, the filter 102 can be a multi-media 103 filter that can include, gravel 104, sand 105 and anthracite 106 which operate to filter the pre-treated water as it flows thru the media 103. Using control system 300, INFLUENT valve 101 allows the flow of treated or settled water from the water source into the filter 102. The level of water in the filter 102 can be ascertained by a level sensor 107. The EFFLUENT flow control valve 113 controls the amount of filtered water that leaves filter 102 and is measured by the effluent flow meter 122. The effluent flow control valve 113 can be a modulating (i.e. percentage open) or a non-modulating (i.e. open/close) valve.

Level sensor 107 can include hydrostatic pressure devices, such as differential pressure transmitters or submersible pressure sensors that utilize piezoresistive sensing elements, ultrasonic/sonar level devices, radar level devices, ultrasonic level devices, capacitance level devices, vibronic level devices, and ball-float level devices. As described above, the filter 102 is a dual media filter that must be backwashed from time-to-time which requires level sensor 107 to monitor the level as the filter level is lowered and raised during the backwash and to monitor and assist in controlling the filter level while filter 102 is filtering water.

Effluent flow meter 122 can include any suitable flow meter that is capable of measuring the flow of water, including using venturi flow tubes with differential pressure transmitters, orifice plate with differential pressure transmitters, ultrasonic, turbine and magnetic flowmeters. As described above, the filter 102 is a dual media filter that filters water and from time-to-time must be backwashed which requires the effluent flow meter 122 to measure and control the filtered water flow out of filter 102 in conjunction with EFFLUENT flow control valve 113 and level sensor 107 to regulate this flow to maintain a constant water level on top of filter 102. During a backwash, EFFLUENT flow control valve 113 is closed after the filter level is lowered to a predetermined low level, remains closed throughout the remainder of the backwash and reopens when the filter backwash is complete and the filter effluent turbidity is at or below a specified low level such as 0.5 NTU.

In an embodiment of the present invention, a multiphase or interface level device that can measure both the media level (e.g., the level of the anthracite 106) and the overall fluid level within the filter 102 is used. For example, multiphase measurement can be done with a radiometric level device, a guided wave radar and capacitance sensor, such as multi-electrode capacitance level sensors, combined in a single device. While it may be preferable to utilize a multiphase or interface level measurement device, embodiments of the present invention can also utilize separate level measurement devices, wherein one level device 120 provides a media level expansion measurement, and a separate level device 107 provides the overall water level in the filter, wherein level device 120 is capable of measuring an interface level that provides the level of the media below the overall filter 102 water level.

Turbidity is a parameter used to determine the quality of water exiting the filter 102 through the EFFLUENT flow control valve 113. Typically, turbidity is measured by a nephelometer which uses light measurements thru water samples to measure the quantity of suspended solids in units referred to as Nephelometric Turbidity Units (NTU). For example, clean water has very low levels of suspended solids or low values of NTU while dirtier water has higher levels of NTU. The quality of potable or drinking water is generally determined by federal, state or community authorities. For example, acceptable desired operational turbidity values in filtered water exiting from the filter effluent are typically less than 0.5 NTU. An effluent turbidity analyzer 114 is used to determine the turbidity of the effluent filtered water. If the filtered water from the filter 102 is determined to be acceptable, for example, the filter effluent has a turbidity of less than 0.5 NTU, a BACKWASH WASTE valve 109, a FILTER TO WASTE valve 110, a BACKWASH SUPPLY valve 111, and a SURFACE SWEEP/AIR SCOUR valve 112, are all closed to allow the filtered water to exit the system via an opened EFFLUENT flow control valve 113.

As the filter 102 operates, over time, the captured suspended solids in the filter's media 103 starts to clog the filter 102 reducing the performance and effluent water flow out of the filter 102. As the filter 102 becomes clogged or dirtier, the effluent turbidity can start to increase, and the filter 102 may begin to experience head loss or a loss of head, meaning that the pressure differential across the filter 102 is increased. A HEAD LOSS device 115, such as a differential pressure transmitter can be used to determine the filter's loss of head.

Some water treatment facilities also utilize Filter Effluent Particle Counter Analyzers. Particle counter analyzers are used to measure the size and quantity of suspended solids in water and can be used to detect Cryptosporidium. Cryptosporidium is a microscopic parasite that causes the diarrheal disease cryptosporidiosis. If the filter effluent particle count begins to rise, this may indicate the need to backwash the filter.

The reduction in filter 102 performance can be measured in various ways including rising filter effluent turbidity, rising filter headloss, rising filter level and time. Should the turbidity of the filtered water or the pressure differential indicated on the head loss device reach unacceptable levels, or if there is a rise in the filter level, such as in varying level filters, more than likely, the filter 102 is no longer capable of removing the undesirable elements from the pre-treated water. Additionally, filter 102 performance tends to degrade overtime. Filter runtime is one of the most common reasons to backwash the filter 102. State regulatory agencies typically recommend and often mandate a maximum duration in hours that a filter 102 should run before it is backwashed. Once the filter's performance is reduced or in instances where it reaches a predetermined filter 102 maximum runtime, the filter 102 must be backwashed to clean it and return the filter 102 to optimum performance. The filter 102 is cleaned using a backwash water system 118 and mechanical surface sweeps or air scour systems 119. The backwash water system 118 includes a BACKWASH SUPPLY valve 111, BACKWASH FLOW CONTROL valve 116, backwash flow meter 117, and a backwash pump (not shown) or backwash holding tank (not shown). The air scour systems 119 include an air blower (not shown) and AIR WASH valve 112. In systems that use mechanical surface sweeps, pressurized water is used to cause a mechanical arm to rotate to loosen the debris in the media 103 surface.

Media level sensor 120 can be a level device that is capable of measuring the level in a multiphase solution as described above in reference to filter level sensor 107. For example, media level sensor 120 can be an ultrasonic sonar level device which must be immersed in water in order to measure the level of the media. When using a level device such as an ultrasonic level device, media level sensor 120 is installed in filter 102 with the bottom of the sensor at a height just below the top of the troughs 108 in order to ensure that media level sensor 120 is submerged at all times during a backwash. As described above, the filter 102 is a media filter, and in an embodiment of the present invention, a sonar level or capacitance level device is used in filter 102 that can measure both the media level while filtering water (e.g., the combined level of the anthracite 106, sand 105, and gravel 104) and the increase in level of the media 103 (media expansion), which is the media level below the overall water level in the filter during a backwash procedure. From this level and change in level, media bed expansion can be calculated in inches, millimeters, or percent. Media bed expansion is defined as the change in media level from the settled media level (e.g., the combined level of the anthracite 106, sand 105, and gravel 104 while filter 102 is filtering water) and the amount that the media is fluidized, expanded or raised during a backwash procedure. Media expansion is caused by reversing water flow through the media from below it with the backwash water system 118 which is controlled by opening the BACKWASH SUPPLY valve 111. The rate of backwash flow, which creates the media expansion, is measured by the backwash flowmeter 117 and controlled by the BACKWASH FLOW CONTROL valve 116. Using control system 300, during the backwash procedure and media bed expansion process the backwash water raises the level of the water in filter 102 to a level that the backwash water flows over and into filter troughs 108 (e.g., typically, one or more troughs are installed across a filter above the media at a certain height and spaced at even intervals to allow backwash procedures to be performed based on the specific design characteristic of a filter). Troughs 108 are long cylindrical tubes, open at the top and installed in opposite filter walls with openings through the filter walls at one or both ends of the trough 108 to allow water to enter or leave the filter. Water that needs to be filtered enters filter 102 through INFLUENT valve 101 on one end of the troughs 108 and then flows into the filter 102. While filtering, the BACKWASH WASTE valve 109 is closed. During a backwash procedure, the INFLUENT valve 101 is closed and the BACKWASH WASTE valve 109 is open. This allows the backwash wastewater to leave filter 102 by overflowing the trough and draining out of the end of the troughs 108, through the BACKWASH WASTE valve 109 to a wastewater treatment system.

Backwash water turbidity sensor 121 is a turbidity analyzer that measures the turbidity of the backwash water during a backwash procedure. The backwash water turbidity sensor 121 is typically installed in filter 102 with the bottom of the sensor at a height just below the top of the troughs 108 in order to ensure that the turbidity of the backwash water is measured at all times during a backwash. As described above, the filter is a media filter, and in an embodiment of the present invention, a backwash water turbidity device is used in filter 102 that can measure both the in-filter or settled turbidity of the water while filtering water (typically, 2 to 5 NTU) and the turbidity of the backwash waste water during a backwash procedure (typically, 5 to 80 NTU). Backwash water is caused by reversing water flow through the media from below it with backwash system water 118 and the duration of the backwash procedure is controlled by the length of time that the BACKWASH SUPPLY valve 111 is open. During the backwash procedure, the backwash water raises the level of the water in filter 102 to a level that the backwash water flows over and into filter troughs 108 allowing the backwash turbidity device 121 to measure the backwash waste water as it flows over and into the filter troughs 108. During a backwash procedure, the INFLUENT valve 101 is closed and the BACKWASH WASTE valve 109 is open allowing the backwash wastewater to leave filter 102 by draining out of the end of the troughs 108, through the BACKWASH WASTE valve 109 to a wastewater treatment system.

Filter systems are designed and built in all types of physical configurations but with two major hydraulic processes for water to flow thru them by gravity (non-pressurized). A majority of these systems fall into two categories—constant level filters and varying level filters. It should be noted that embodiments of the present invention can be used in all types of water filter systems. Although FIG. 1 depicts a single filter 102, water treatment plants typically include multiple filters ranging from as few as two to over one hundred depending on the size of the water treatment plant, and embodiments of the invention described herein can be used in each of a water treatment plant's filters.

Constant Level Filters

Constant level filter systems typically include three or more filters 102 and utilize a common influent channel or pipeline to allow the flow of treated or settled water from the water source to each of the filters 102. Water from the influent channel or pipeline flows directly into each filter 102 thru open INFLUENT valves 101 above the media 103 and equalizes at the same level in all filters 102. Water flows downward thru each filter 102 by gravity thru the media 103 and then thru filter underdrain or bottom equipment 123 into a collection gullet where it flows out of the filter 102 thru a modulating EFFLUENT FLOW CONTROL valve 113 prior to it being delivered to the end consumer or to the environment. Notwithstanding any minimal loss of fluid via evaporation, maintenance or testing performed on the filter 102 system during operation, in general, the total amount of water that goes into a filter 102 system thru the common influent channel or pipeline must come out of the filter 102 system through the sum of the individual modulating filter EFFLUENT FLOW CONTROL valves 113 which maintains a constant level in the filter 102 system. This constant level is accomplished by utilizing a modulating EFFLUENT FLOW CONTROL valve 113 on the effluent of each filter 102 in conjunction with an effluent flow meter 122 and filter level sensor 107.

Filters 102 which have been backwashed recently have clean or substantially clean media 103 which allow water to flow through them at a much quicker rate than filters 102 which have dirty or partially dirty media 103. The longer that a filter 102 runs, the more it collects suspended solids in its media 103 increasingly impeding water flow thru that filter 102. Typically, in a water treatment plant with multiple filters 102, each individual filter 102 will have a different flow rate proportional to the cleanliness of the media 103 in the filter 102. The sum total of the effluent flows 122 out of the filters 102 shall be equal to the flow into the filter 102 system from the flow of treated or settled water from the water source.

Each filter 102 has its own level sensor 107 and modulating EFFLUENT FLOW CONTROL valve 113 which, the process control system 300 uses to maintain a relatively constant level in the filter 102 regardless of the effluent flow rate through that filter 102. After a backwash, when a filter 102 with clean media 103 is placed back in service, the cleaned media 103 allows a maximum water flow rate through it which proportionately and slightly lowers the level of the overall filter 102 system. The process control system 300 utilizes each filter's level sensor 107 measurement to react to this very slight but declining level change and adjusts a filter's respective modulating EFFLUENT FLOW CONTROL valve 113 to close slightly in order to restrict water flow out of its filter 102 to compensate for the decreasing level change which then increases to maintain a constant level over the filter 102 system at all times. In one embodiment, the effluent flow meter 122 measurement and filter level device 102 measurement are used in combination to maintain a relatively constant level in the filter.

Water flow through a filter 102's media 103 is inversely proportional to the cleanliness of the media 103. After a backwash, when a filter 102 has the cleanest media 103, the EFFLUENT FLOW CONTROL valve 113 is open a minimum amount allowing a flow rate through filter 102 proportionate to the total number of filters 102 in the filter 102 system. As water flows through the media 103, the media 103 begins to collect suspended solids slowly becoming dirty and impeding the flow of water through filter 102. Over time, the increasingly dirty media 103 causes the EFFLUENT FLOW CONTROL valve 113 to slowly open to allow more water to flow through filter 102 to maintain the constant level across the filter 102 system. Often, immediately before filter 102 is due to be backwashed with the media 103 at its dirtiest, the EFFLUENT FLOW CONTROL valve 113 is open a maximum amount allowing a flow rate through filter 102 proportionate to the total number of filters 102 in the filter system 100.

As the various filters become dirty over time, the water level slowly rises and the level sensors 107 compensate by slowly modulating the effluent control valves 113 of each filter to open or close more in order to maintain a constant level over the filters at all times. The longer a filter 102 runs before being backwashed the dirtier it becomes, reducing the flow of water thru it, and as a result, the respective effluent control valve 113 must increasingly open in order to maintain constant level. In a constant level filter system, you can determine how dirty a filter 102 is respective to other filters in the filter system by the percentage amount that its effluent control valve 113 is open compared to the other filters. The more open the effluent control valve 113 is, is an indication that the filter 102 is dirtier as compared to other filters. This can also be used to determine when a backwash of the filter 102 is needed.

Varying Level Filters

Varying level filter systems typically include three or more filters 102 and utilize a common influent channel or pipeline to provide water to all of the filters 102 over individual weirs into each filter 102. The weirs are physically adjusted and set to a specific but equal height to ensure that a proportionate and equal amount of water flows from the common influent channel or pipeline into each filter 102. After the weir, the water flows through an INFLUENT valve 101 into filter 102, allowing each filter to operate at a different level. In lieu of or in combination with weirs, varying level filter systems can also utilize modulating influent control valves 101 that can be used to regulate the effluent flow rate, including controlling the respective filters' influent modulating control valves to achieve substantially identical effluent flow rates across the filters. Similar to constant level filters water flows downward through the media 103 by gravity and then through filter underdrains or bottom equipment 123 into a collection gullet where it flows out of the filter 102 typically through a fully open/fully close non-modulating EFFLUENT FLOW CONTROL valve 113 prior to it being delivered to the end consumer or to the environment. However, modulated effluent control valves, such as those typically used in constant level filters can also be used. Further, varying level filter systems can also utilize modulating effluent control valves that can be also used to regulate the effluent flow rate, including controlling the respective filters' effluent modulating control valves to achieve substantially identical effluent flow rates across the filters.

In the case of varying level filters while filtering water, the open-close EFFLUENT FLOW CONTROL valves 113 are typically fully open at all times allowing each filter 102 to seek its own level based on a certain flow rate, the gravitational effect of water's weight and how dirty the filter's media 103 is. The cleaner the media 103 is at any flow rate, the lower the level in filter 102 will be. As the media 103 collects suspended solids over time, the water level in filter 102 will increase proportionate to the flow rate, the gravitational effect of water's weight and the dirtiness or resistance of the media 103. When the water level in filter 102 has risen to a predetermined maximum height, the media 103 is considered dirty and it is time for filter 102 to perform a backwash. Clean filters that have been backwashed recently allow water to flow thru them at a much quicker rate than dirty or partially dirty filters. The longer that a filter 102 runs, the more it collects suspended solids in its multimedia causing it to become dirtier and impeding flow thru that filter. In a water treatment plant with multiple varying level filters, each filter 102 will typically run at the same flow rate but with different water levels in each filter 102 based on individual filter 102 runtimes, water height and degree of cleanliness.

Varying level filters are typically taller in height than constant level filters to allow the filter 102 level to increase over time proportionate to filter 102 flow rate and media 103 cleanliness. Typically, the influent water cascades into the filter and because the effluent control valve 113 in varying level filters is typically run in a fully open position, the filter level is a result of how quickly the water can flow thru the multimedia, which is based on the dirtiness of the filter.

After a backwash when a clean filter is placed back in service, the influent flow control valve 101 is opened and the water flows thru the media very quickly and is at its lowest level. As the media gets dirty, the level in the filter begins to increase due to resistance and dirt in the media. Because the effluent valve 113 is typically fully opened and therefore provides a constant effluent flow rate, the amount that the water rises is typically proportional to the dirtiness of the media and the gravitational effect of water's weight pushing thru the ever increasingly dirty media.

Like constant level filters, each filter 102 can include its own level sensor 107 that measures the level of the water in the respective filter 102. In the case of varying level filter systems, level sensor 107 is used to measure the increasing water level in filter 102 as it filters water over time, but because the effluent control valve 113 in these filters is typically fully opened/fully closed, these level sensors 107 are typically used to measure the water level as an indicator of when a backwash may need to be initiated. Additionally, like constant level filter systems, when the filter water level reaches a dangerously high level (e.g., approaching filter overflow), the system can generate an alarm, and automatically close the filter INFLUENT control valve 101. Level sensors 107 can also be used in combination with modulated influent control valves 101 or modulated effluent control valves 113, or a combination of both to achieve substantially identical effluent flow rates across the filters.

In a typical varying level filter system that utilizes non-modulating influent or effluent control valves (101, 113 respectively), as the various filters become dirty over time, the water level in respective filters slowly rise and you can determine the dirtiness of a filter respective to other filters by looking at the height of water in each filter. The higher a filter's level the dirtier the filter is. The height of the filter's water can also be used to determine when a backwash of the filter is needed.

In one embodiment, the process control system 300 in both constant level and varying level filter systems, uses modulated influent and effluent control valves (101, 113 respectively), including in combination with the filter water level to control the overall runtime of a filter 102, by reducing the time required to backwash a given filter 102. For example, in instances of higher demand for water supply, controlling these devices can allow longer filter runtime, by for example, reducing the flow rate in a given filter, in order to maintain an acceptable turbidity reading or turbidity rate increase. Additionally, when a filter is out of service, for example due to maintenance, including the need for backwashing a filter, controlling the influent and effluent control valves (101, 113 respectively), the influent and effluent flow rates, and including using the filter level sensor 107 of the remaining online filters can be used to increase effluent flow rates to meet the demand due to a filter being out-of-service.

Control Systems

While FIG. 1 depicts the filter system 100 and its associated instrumentation, and valves, FIG. 3 shows the various instrumentation, actuators and valves of the filter system 100 operatively in communication with a control system 300, such as a DCS, PLC, SCADA, or wireless control system (e.g., wireless instrumentation and control devices that communicate in over a wireless network, including those that implement industry standards, such as the WirelessHART or HART 7 standard), or a combination of these types of control systems that are used to monitor and control the operation of a water filter system, including a backwash system and method in accordance with an embodiment of the present invention. Further, communication and connection of the various instrumentation, actuators and valves with the control system, can also include a communication bus for controlling and monitoring the various instrumentation, actuators and valves within the water filter system, wherein the communication bus comprises an Actuator Sensor-Interface (AS-I) two-wire network 312 in a loop and or star configuration coupling various instrumentation, actuators and valves to the filter control system, such as depicted in FIG. 3.

In one embodiment, the operation and control of the filter system 100, including all of the valves, pumps and sensors (cumulatively, the "devices") can be controlled or monitored by a control subsystem 300. The devices are generally coupled to the control panel 300 via a bus 312. Additionally, the system can be controlled and monitored remotely, and filter system 100 data for one or a multitude of filter systems is collected, analyzed, and used for benchmarking purposes, as well as optimization and predicting operation of filters to generate and predict filter setpoints, measurements, and values. For example, and as shown in FIG. 6 and as discussed further below, there is data collection via a computer communication network of the filter operating parameters and determined setpoint data for a plant filter system, wherein using data analytics, artificial intelligence, machine learning and/or neural network methodologies to: predict the subject, a related, or an unrelated filter's performance and/or operational setpoints; generate benchmarking metrics for filter systems' operation and maintenance; and/or generate setpoints and anticipated measurement and filter operational values.

Figure 6:
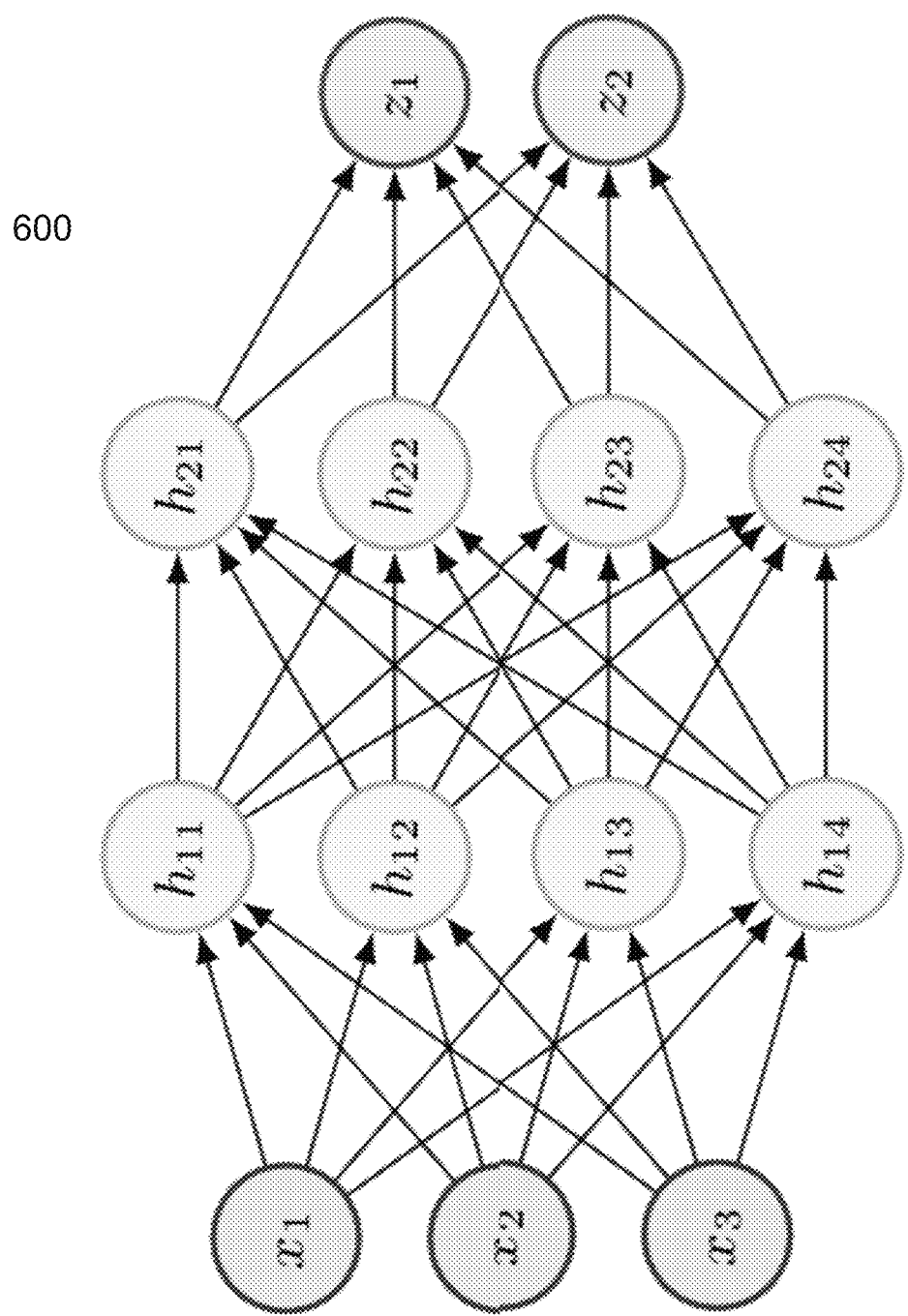
FIG. 6 is a neural network (NN) architecture 600 implemented in an embodiment of the present invention.

FIG. 6 shows an example of a deep neural network (NN) architecture 600 including a matrix of connected neuron processors. The matrix of neural processors is configured as a computation unit that operates as a two-dimensional systolic array. The two-dimensional systolic array includes multiple cells that are configured to identify probabilities for three categories of content. By way of example, the input neurons $x_1$ through $x_3$ are activated through input data and operate as sensors that perceive the input, and are for example in an embodiment of the invention, filter parameter data, such as measurement data that is received from filter instrumentation, and can include filter media level from level device 120, filter tank turbidity measurements from backwash turbidity meter 121, and filter backwash flow rate from filter backwash flowmeter 117. The middle layers, sometimes referred to as the hidden layers, which include neural processor layers $h_{11}$ through $h_{14}$ and $h_{21}$ through $h_{24}$, are activated through weighted connections and receive activation data from previous neural processors. For the sake of simplicity, two middle layers are shown although these layers can be multiples of what is shown and the number of layers depends upon the input and how "deep" of an accumulative learning process is required to obtain a reliable result. Some of the neural processors in the middle layers will influence the output by triggering events based upon one or more other events occurring in the middle layer or directly from input data. Depending upon the accuracy and comprehensiveness of the input data, the problem to be solved and how the neural processors are connected, obtaining an output $z_1$ and $z_2$, for example optimum filter bed media expansion setpoint during the high-wash backwash procedure, and optimum filter backwash turbidity after completion of the high-wash backwash procedure, that reliable within a degree certain can require long causal chains of computational stages wherein each of the stages in the chain transforms the activation of the subsequent stages in a non-linear fashion. As shown in FIG. 6, the deep neural network 600 is configured to analyze each of the vectors to generate probabilities to determine a final confidence score for the output $z_1$ and $z_2$ that reliable within a degree certain.

Further, in one embodiment, communication and control of the control subsystem 300 and the devices adhere to the Actuator Sensor-Interface (AS-I) standard. The AS-I bus 312 is comprised of two (2) wires, preferably fourteen (14) gauge wires, capable of carrying digital data and power to the various devices. The power to the bus 312 is provided by the control subsystems' power supplies PS1 and PS2. The AS-I standard specifies that the power supply generally provide a low voltage generally twenty-four (24) to thirty (30) volts over the bus 312.

As shown in FIG. 3, the control logic of the control subsystem 300 is a programmable logic controller (PLC) 306. However, other control systems or control system components, such as SCADA, DCS and wireless control systems can be used in accordance with an embodiment of the invention. The controller 306 provides the necessary processors to transmit and receive data over the bus 312. Should the PLC or other control system component be non-AS-I compliant, a gateway 304 provides the necessary interface for the control subsystem 300 to transmit and receive digital data and power over the bus 312. A display 302 generally provides status information of the filter system 100. In addition, a man machine interface 370 provides the necessary interface for a user to initiate various control and monitoring functions of the devices, such as initiating a backwash process. For security, the control subsystem 300 may include hardware (such as a key lock) or software (password) to prevent unauthorized personnel from using the system.

The AS-I standard generally specifies a master/slave bus configuration. The control subsystem (master) and the devices (slave) are designed to operate on an AS-I bus 312, wherein the devices, such as valves and measurement instrumentation (sensors) are coupled to the bus for power and communication via an AS-I interface. For example, a device may be a valve, such as the INFLUENT valve 101. The INFLUENT valve 101 includes a valve, an actuator and an AS-I interface 356. The INFLUENT VALVE 101 is coupled to the AS-I bus 312 via AS-I interface 356. In addition, the interface can include a switch and a disconnect switch offering a convenient method to remove, replace or repair a slave device while the remainder of the bus devices remain on line. Further the state of the valves can be ascertained by the AS-I interface. The AS-I valve interfaces may include positioning sensors to ascertain the state (e.g., the position of a disc of a butterfly type valve) of the valves. In addition, the AS-I interfaces can include processing capabilities to communicate digital data to and from the sensors and valves and provide power from the bus 312. As shown in FIG. 3, the actuators of valves 101, 109, 110, 111, 116, 112, and 113 are coupled to the AS-I bus 312 via AS-I interfaces 356, 354, 352, 360, 346, 340 and 338, respectively. Similarly, measurement sensors 107, 120, 121, 115, 114, 122, and 117, are coupled to the AS-I bus 312 via AS-I interfaces 358, 362, 364, 350, 348, 344, and 342, respectively.

Referring to FIG. 3, each AS-I Interface includes a processor (not shown) for sending and receiving data from the bus 312. The AS-I interfaces are configured in a serial fashion on the bus 312 and each interface (i.e., each slave) has its own identification number. Furthermore, the AS-I interfaces also provide power from the bus 312 to energize/de-energize the solenoids of the actuators of the various valves. Consequently, should the filter system operate in the normal mode (e.g., pre-treated water flowing through the filter bed and out of the system), the control subsystem 300 would provide the necessary power and command over bus 312 to open the INFLUENT valve 101 via interface 356 and the EFFLUENT valve 113 via interface 338, while closing the DRAIN VALVE 109 via interface 354, the BACKWASH valve 116 via interface 346, the AIRWASH valve 112 via interface 340 and the FILTER TO WASTE valve 110 via interface 352. In addition, should it be necessary to enter a backwash process, the control subsystem 300 would provide the necessary power and command to the appropriate valves to perform such process (as previously described). Thus, operating parameters of the water treatment system may be monitored by the control subsystem 300 via the AS-I bus 312.

Although the topology of the various AS-I interfaces and devices can be in a number of configurations, such as a linear configuration or a tree configuration, the preferred topology is a loop configuration (as shown in FIG. 3). The loop configuration provides for better fault tolerance. For example, should the bus 312 experience a break 390, power and data and still be carried over the bus 312 in either direction A or B, away from the break. Furthermore, a test sequence may be initiated by the control subsystem 300 to test the various devices. Upon receipt of a test command, the processor within the AS-I interfaces performs a self-test to determine the status of the device. The results of the self-test are transmitted to the control subsystem 300 via the bus 312.

Next, the control subsystem 300 is capable of interfacing to a Supervisory Control and Data Acquisition (SCADA) system or other control subsystems via a communication link 363 or a wireless system. In one embodiment, the communication link 363 is an Institute of Electrical and Electronic Engineer (IEEE) standard 802.3 bus (ETHERNET). Typically, a water treatment plant includes a number of water filter systems. Therefore, from a single location, the SCADA system can monitor and control the various water filter systems from one location via the communication link 363.

Also, status from the various devices may be monitored by a user or a software routine for further action. For example, the water filter system may be damaged should one of the valves in the system malfunction. For instance, should valve 101 not close upon a command to close, the valve's AS-I interface 356 could sense the malfunction and trigger an alarm. Since each AS-I device has its own identification device number, the AS-I interface 356 would transmit the alarm status to the control subsystem 300 via the bus 312, whereby the control subsystem 300 would identify the malfunctioned valve.

In addition, the devices and control subsystem of the present invention may be pre-packaged in a kit form. The devices and control subsystem may be pre-tested for installation. Consequently, the kit can be used to retrofit existing and new water filter systems.

Filter Backwash System

The need to perform a filter backwash can be determined by a variety of measured, control system 300 generated, or external system generated filter parameters, including a predetermined high effluent turbidity that is measured by effluent turbidity meter 114, high head loss, which is measured by pressure differential transmitter 115, maximum filter runtime, high water level in the filter 102 (e.g., in varying level filters), percentage open of the effluent flow control valve 113, effluent flow rate, influent flow rate, filter effluent particle count, anticipated values for these parameters that is generated through data analytics, artificial intelligence, machine learning and/or neural network methodologies, or a combination of these values. These value setpoints can be stored in a database, in processor memory, integrated into the control system 300, or received via external or remote inputs. The system receives inputs from the various instrument devices, or by internal system programs that analyze, manipulate, or transform the instrument value data into new system data that is a system process value. For example, one setpoint might be an effluent turbidity setpoint of 0.4 NTU. As the system 300 receives effluent turbidity measurement data from effluent turbidity meter 114, the system 300 compares this to the stored or in some cases generated effluent turbidity setpoint, and if the effluent turbidity setpoint is reached, the control system 300 signals initiation of the backwash procedure, as depicted in the flowchart shown in FIG. 4 at step 401. Similarly, if the measured or system generated values of one of the preceding filter parameters exceeds the programmed setpoint, the system 300 initiates the backwash procedure 401.

Figure 4:
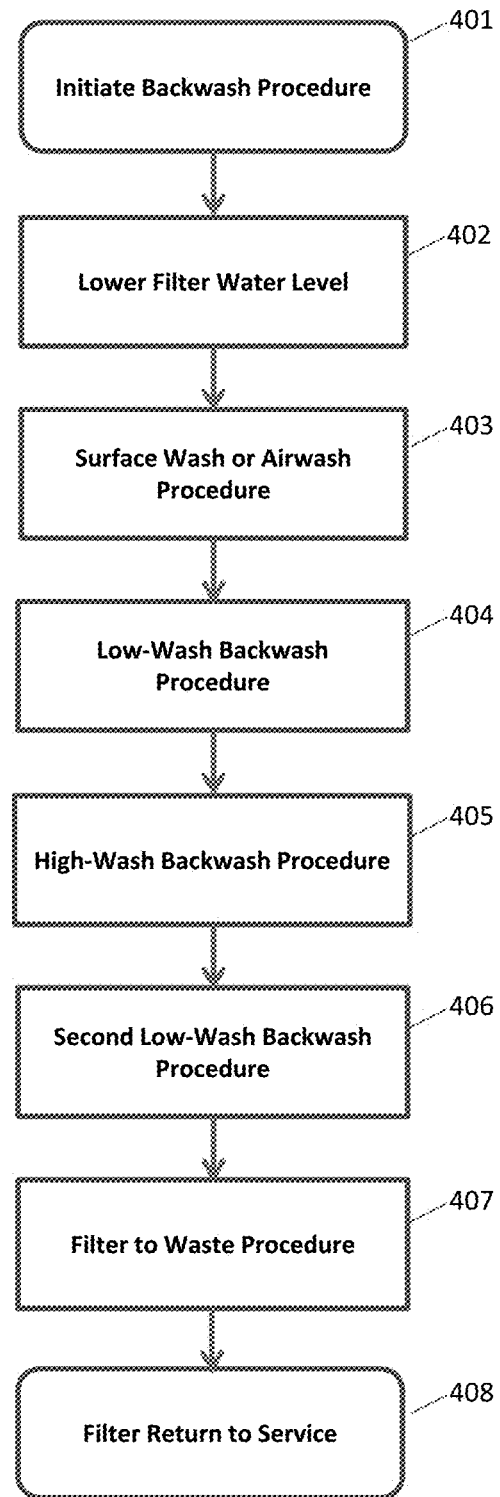
FIG. 4 is a flow chart of an exemplary method of controlling the filter backwash process in a water treatment plant as exemplary embodiments of the present invention.

At the beginning of a backwash procedure, using control system 300, the level of the water in the filter 102 is lowered to a predetermined or system 300 generated low-level setpoint above the media 103, which is typically between four (4) to six (6) inches above the media 103, by closing INFLUENT valve 101 while the EFFLUENT FLOW CONTROL valve 113 is still opened as shown in the flowchart in FIG. 4 at step 402. The backwash low-level setpoint can be generated using data analytics, artificial intelligence, machine learning and/or neural network methodologies, or a combination of these values to: predict the subject, a related, or an unrelated filter's performance and/or operational setpoints; and/or generate benchmarking metrics for filter systems' operation and maintenance. For example, the optimum low-level backwash setpoint can vary based on the current conditions of the filter 102 and operational parameters of the filter 102 since the most recent backwash procedure was performed. For example, it is possible that at the time of backwash, the filter media 103 bed is dirtier than normal, and lowering the filter level too much, for example 4" above the media 103, might remove too much water such that the surface sweeps or air scours cannot operate effectively, creating a more viscous sludge in the filter 102, that could result in under-fluidization of the media 103 in subsequent low and high wash steps 404, 405 (FIG. 4). For example, the influent water supply might have a higher than normal NTU value of 5, and/or the filter has been running at maximum capacity or designed production rate, causing a dirtier filter bed. In one embodiment, the system determines and anticipates the recommended low-level backwash setpoint based on these and/other filter parameters using historical filter data, including data analytics, artificial intelligence, machine learning and/or neural network methodologies, or a combination of these processes.

In one embodiment, during step 402, level sensor 107 measures the decreasing water level in filter 102 until it reaches a predetermined or system 300 generated level setpoint above media 103, which then closes EFFLUENT FLOW CONTROL valve 113. Once control system 300 confirms or receives an input that EFFLUENT FLOW CONTROL valve 113 is closed, using control system 300 the BACKWASH WASTE valve 109 is fully opened. The SURFACE WASH or AIR WASH valve 112, the FILTER TO WASTE valve 110 and the BACKWASH SUPPLY valve 111 remain in a closed position, and in one embodiment control system 300 confirms these valve positions, and provides an alarm if the valves are not in a correct state at the stage of the backwash procedure. The level drop can be detected by the level sensor 107. Using control system 300 after the water level is dropped to a predetermined or system 300 generated acceptable level (e.g., as detected for example by the level sensors 107 or 120), the DRAIN valve 109 is closed. The INFLUENT valve 101, the EFFLUENT valve 113, the BACKWASH valve 111 and the FILTER TO WASTE valve 110 remain closed, and in one embodiment control system 300 confirms these valve positions, and provides an alarm if the valves are not in a correct state at the stage of the backwash procedure.

Referring to step 403 in the flowchart in FIG. 4, in older filter systems, multiple mechanical rotating surface sweeps, depending on the surface area size of a filter 102, installed in the anthracite media 106 and driven by distribution system water pressure are used to assist the low-wash flowrate backwash water at the beginning of a backwash procedure to help break up the compacted and dirty media 103 and assist in fluidizing the media 103. Surface sweeps are mechanical arms that rotate (generally slowly) by control system 300 opening the SURFACE WASH valve 112' and forcing pressurized water through orifices located on the back of the sweep arms to force them to rotate just beneath the surface of the media 103. Fluidized media is defined as applying a reverse flow of water through settled media 103 to elevate, mix and ultimately wash suspended solids from the media 103 at predetermined flow rates and predetermined media bed expansion. Media bed expansion is defined as the difference in level in inches, millimeters, any suitable basis for measurement, or percent between the settled media level while filtering water and the expanded media level while backwashing filter 102. For example, typical media 103 in a filter 102 can be a lower level of 12 inches of sand 105 and an upper level of 18 inches of anthracite 106. Hence the total media 103 depth or level is 30 inches while filtering. While backwashing with a sufficient reverse flow of water from under the media 103, the media will expand or fluidize by as much as 20% or more (6 inches or more) to an overall fluidized level of 36 inches or more.) Similar to the air blower, to control the speed of rotation of the mechanical sweeps, control system 300 can control a variable frequency drive that is operatively coupled to surface wash supply pump 366' or can control a surface wash supply control valve 112'.

Referring to step 403 in the flowchart in FIG. 4, in newer filter systems, compressed air from a blower system 119 is used to assist low-wash flowrate backwash water at the beginning of the backwash procedure to help break up the compacted and dirty media 103 and assist in fluidizing the media 103. Air washes and air bubbles from them have been determined to be more effective than older surface sweep systems as they cover the entire surface area of filter 102 and more effectively fluidize the media 103 during the initial low-wash procedure. Using control system 300, compressed air is supplied by a blower system 119 (that includes a blower 366 (FIG. 3) and air wash valve 112) through a header to filter 102 by opening AIR WASH valve 112 during the initial low-wash flowrate step of the backwash procedure. Air wash valve 112 can be an open/close valve or a modulating control valve that opens or closes in increments, based on the control system 300 output values to the air wash valve 112 actuator to control the air wash flow rate. Typically, the optimal air flow rate for a filter 102 is predetermined by using the size of the blower system, physical hydraulic air header system and depth of media 103. Typically during an air wash procedure, control system 300 runs blower system 119 at full capacity to produce the required air wash flow rate based on the physical characteristics of filter 102 and the media 103. However, in another embodiment using control system 300, a variable frequency drive can be used to control the air blower 366 in order to control the air flow rate, which can be measured by an air flow device, such as an orifice with a differential pressure transmitter. Although not shown in FIG. 3, a VFD can also receive multiple inputs via the two-wire AS-I bus or direct/indirect wiring from a control panel to the VFD. Control system 300 can also control the air flow rate by sending outputs to control both the air blower 366 (e.g., via VFD (not shown)) and air wash valve 112.

In one embodiment, as shown in FIG. 4 at step 403, the air wash or surface wash is performed before backwash water enters the filter 102. Using control system 300, the air wash system 119 utilizes the remaining low level water in the filter 102 after the filter has been drained to a predetermined low level to help fluidize the media bed 103 and breakup the compacted and dirty media 103 before proceeding to the next step 404 (low-wash backwash procedure) of the backwash procedure as shown in FIG. 4.

After a predetermined period of time for the surface wash or air wash procedure to elapse, or in one embodiment, once the media is fluidized to an optimal fluidization, optimum breakup of the filter debris or backwash turbidity, control system 300 initiates the initial backwash low-wash step 404 as shown in the FIG. 4 flowchart. At the beginning of the backwash low-wash step 404, control system 300 controls the backwash flow rate at a low flow by monitoring the flow using the backwash supply flow meter 117 and controlling backwash supply pump 368 or backwash control valve 116. In another embodiment, control system 300 controls the backwash low-wash flow using the filter level or rise rate of the filter level. In another embodiment, control system 300 controls the low-wash backwash flow rate by monitoring the fluidization of media bed 103, filter level, or filter tank turbidity using a filter backwash turbidity meter 121 installed at or below the filter troughs 108. Still in another embodiment, control system 300 controls the low-wash backwash flow rate by monitoring the filter tank's turbidity increase or rate of increase and comparing that to a backwash flow rate, total flow, or flow over elapsed time.

The flow of backwash water up through the media 103 causing expansion of the media is called fluidization of the media bed 103. Because the backwash process cleans the filter to remove the influent water debris and particles that have settled in the media 103, the water becomes very muddy, increasing the turbidity in the filter. Although this is a low backwash flow, there is still the potential for over-fluidization of the filter media 103, meaning that there is too much backwash fluid added causing the media 103 to spill over the troughs 108 with the backwash water into the drain. For example, because the trigger to initiate a filter backwash is typically based on State regulatory agencies mandated filter runtime limits, it is possible that at the time of backwash, mandated or otherwise, the filter media 103 bed is not sufficiently dirty to necessitate higher low-wash flow rates, which if used, could result in over-fluidization of the filter media 103. For example, if the influent water supply has a low NTU value of 2.0, and/or the filter has been running below its capacity or designed average production rate, and/or the effluent turbidity, and/or the filter 102 level has been low (e.g. in varying level filters) the filter 102 may not be sufficiently dirty to perform backwash at preprogramed low and high wash rates because of the potential for over-fluidization.

In one embodiment, during the initial low backwash process as depicted in FIG. 4 at step 404, a predetermined low backwash media expansion setpoint is used, and the networked computer system monitors the media expansion and controls the media expansion in order to maintain the desired low backwash media expansion setpoint by controlling the backwash low flow that is flowing up through the media 103, such as using BACKWASH FLOW CONTROL valve 116. In another embodiment, the system 300 determines the optimum initial low backwash media expansion setpoint or initial low backwash low flow rate and initial low backwash total run time or initial low backwash total flow using filter system operating parameters since the last backwash of: an average or mean influent NTU, effluent NTU, filter box NTU as measured by backwash filter backwash turbidity meter 121, filter 102 level, filter effluent flow rate or filter 102 differential pressure, filter 102 runtime or filter effluent production; or any combination of these filter system operating parameters. In yet another embodiment, there is data collection via a computer communication network of these filter operating parameters and determined setpoint data for a plant filter system, wherein using data analytics, artificial intelligence, machine learning and/or neural network methodologies to: predict the subject, a related, or an unrelated filter's performance and/or operational setpoints; and/or generate benchmarking metrics for filter systems' operation and maintenance.

In another embodiment, during the initial low backwash process, the system monitors the media expansion and controls the media expansion using a predetermined low flow rate in order to maintain the media expansion by controlling the backwash low flow that is flowing up through the media 103. As backwash water is added the media bed experiences fluidization. Once the initial low backwash process has completed the system initiates the backwash high flow rate or high-wash backwash procedure as shown in FIG. 4 at step 405.

Figure 5:
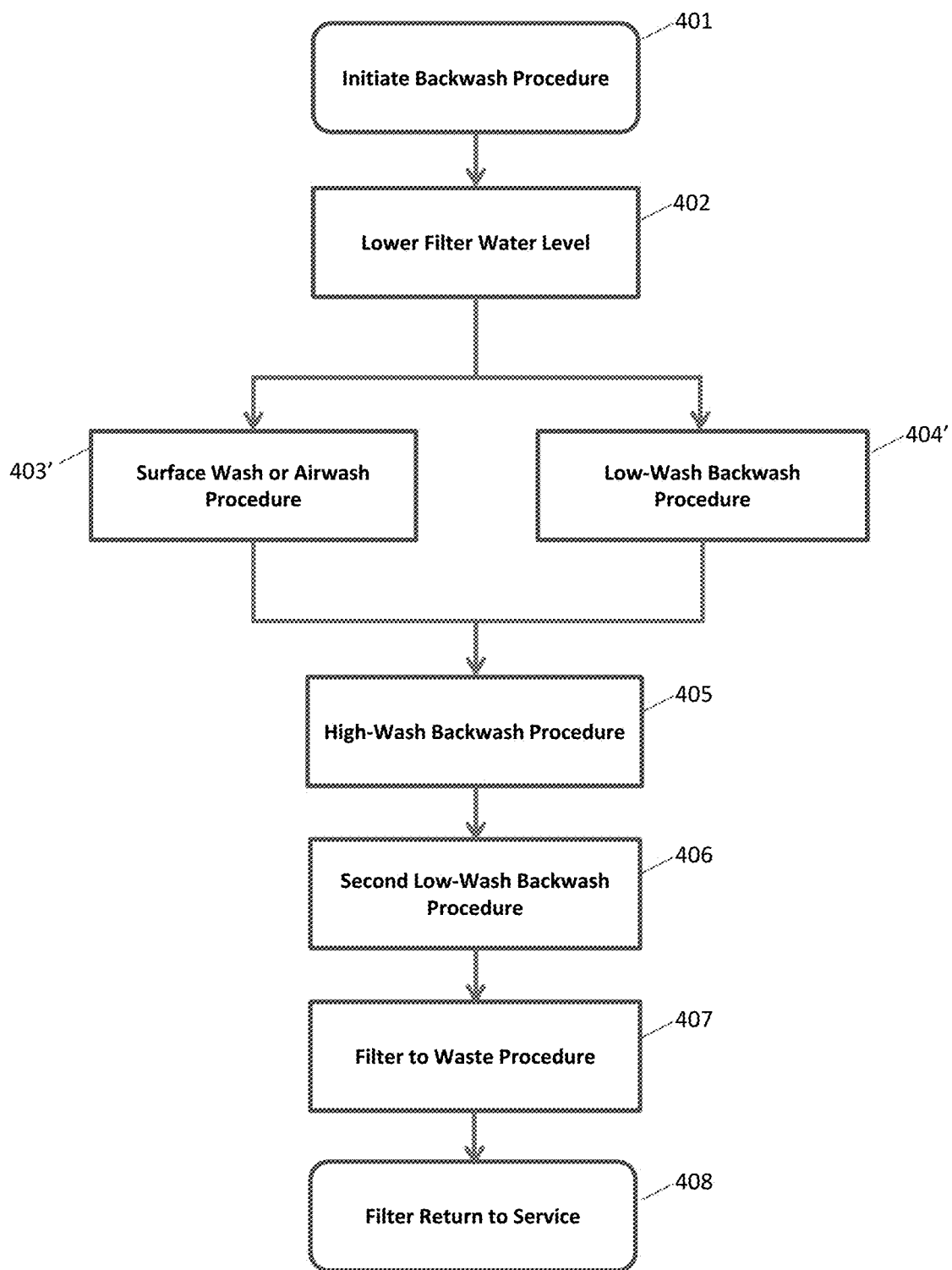
FIG. 5 is a flow chart of an exemplary method of controlling the filter backwash process in a water treatment plant as exemplary embodiments of the present invention.

Referring to the flow chart in FIG. 5, in another embodiment, a low flow rate of backwash supply water is provided simultaneously with the air wash to help fluidize the media bed 103 and breakup the compacted and dirty media 103 before proceeding to the next step of the backwash procedure as shown in FIG. 5 at steps 403' and 404'. Here, while air is being provided to the media bed 103 to break up the dirty media, backwash water is provided to the filter using a backwash pump, opening BACKWASH valve 111 or backwash control valve 116 and monitoring the backwash flow using backwash flow meter 117. And when backwash water is being supplied at the same time as the air scour, the control system 300 can also control the backwash flow by varying the speed of the backwash pump 368 (FIG. 3) using a VFD and modulating the open-closed percentage of the backwash control valve 116. In another aspect of this embodiment, filter media bed expansion is monitored and controlled by control system 300 based on a predetermined optimal air or surface wash flow rate and low flow rate backwash, wherein control system 300 controls the air or surface wash flow rate and low flow backwash flow rate to control the media fluid bed expansion or rate of media bed expansion. The flow of backwash water up through the media 103 causing expansion of the media is called fluidization of the media bed 103.

In one embodiment, at the beginning of the initial backwash low-wash step 404' shown in FIG. 5, the SURFACE WASH valve 112 or the AIR WASH valve 112 is fully open and the INFLUENT valve 101, EFFLUENT FLOW CONTROL valve 113 and the FILTER TO WASTE valve 110 remain fully closed, and the BACKWASH WASTE valve 109 remains opened, and in one embodiment control system 300 confirms these valve positions, and provides an alarm or stops the backwash procedure if the valves are not in a correct state at the stage of the backwash procedure. Using control system 300, the backwash water system 118 is turned on, BACKWASH SUPPLY valve 111 is opened allowing potable backwash water from the clearwell (i.e., typically, a large concrete basin that stores treated water from the filters 102 before being pumped into the distribution system for consumers use) or directly from the consumer distribution system to enter filter 102 through the backwash flowmeter 117 and the modulating BACKWASH FLOW CONTROL valve 116. In one embodiment control system 300 confirms these valve positions, and provides an alarm or stops the backwash procedure if the valves are not in a correct state at the stage of the backwash procedure. The initial low-wash backwash step is used to slowly refill the filter 102 while assisting the surface sweeps or air wash systems in breaking up and fluidizing the media 103. Once the desired fluidization is reached, which as discussed above in reference to FIG. 4 and step 404, can be determined or generated using various filter parameters and predictive parameters using data analytics, artificial intelligence, machine learning and/or neural network methodologies to: predict the subject, a related, or an unrelated filter's performance and/or operational setpoints; and/or generate benchmarking metrics for filter systems' operation and maintenance, control system 300 terminates the initial backwash low-wash 404' and surface wash or airwash 403' procedures as shown in FIG. 5 and initiates the backwash high-wash procedure as shown in FIGS. 4 and 5 at step 405.

In another embodiment, the ending of steps 403' and 404' in FIG. 5, can also be achieved by filter level sensor 107 providing a measurement to control system 300 that is a predetermined level value (e.g., that the filter water level has risen to a level where the water can flow over the troughs 108 and out of filter 102), and then the system 300 initiates the high-wash backwash procedure as shown in FIG. 5 at step 405.

A variety of backwash water supply systems can be utilized. For example, Lead Lag Dual Variable Speed Pump Systems utilize two pumps running at variable speeds to create a low-wash flow rate and a high-wash flow rate. One pump is used for the low-wash flow rate and both pumps are used for the high-wash flow rate. The pumps are started based on which one is assigned the lead designation and the other one a lag designation. In these systems, a modulating flow control valve 116 is not typically used, and instead the backwash flow to a given filter in a multi-filter configuration water treatment system is controlled by BACKWASH valve 111. In single pump systems, a common backwash flow control valve 116 and common Backwash Flowmeter 117. This system utilizes one pump to provide backwash supply water from the clearwell. The water is pumped thru a common Backwash Flowmeter 117 and common Backwash flow control valve 116 which controls the backwash flow rate for both low and high washes for all filters.

Backwash holding tank systems use an elevated Backwash Holding Tank installed high enough above the filters to allow gravity flow from the tank to provide adequate low and high wash flow rates without the benefit of a pump. Water from the clearwell is pumped into the holding tank by one or more pumps and controlled by a level system in the tank. The level system is responsible to maintain a sufficient level in the holding tank at all times for at least two or more backwashes. Backwash water from the holding tank is provided to the Filter Backwash Supply flow control valve 116 thru a common Backwash supply line and backwash pump 368.

In one embodiment of the present invention, the backwash high-wash procedure 405 (FIG. 4 or 5) in the control system 300 includes a pre-determined or generated high-wash flow rate control system and/or a pre-determined or generated timer control. In a further aspect of an embodiment of the present invention, the control system 300 determines a backwash high-wash flow rate or backwash high-wash duration based on the filter level or rise rate of the filter level, the fluidization of media bed 103, filter tank turbidity using filter backwash turbidity meter 121, the filter tank's turbidity increase or rate of increase, the low-backwash flow rate, low-backwash total flow, or low-backwash flow over elapsed time, or any combination of these parameters. Control system 300 includes the backwash high-wash flow control system, which can include a backwash flowmeter 117, modulating BACKWASH FLOW CONTROL valve 116, backwash flow rate set point, backwash total flow, high-wash backwash duration timer, a media expansion level setpoint, a media level setpoint, or a media level expansion rate of change setpoint. In some cases a minimum high-wash backwash duration is set by a consultant or state regulatory agency. As discussed in this paragraph, these filter parameters and setpoints can be a variety of measured, control system 300 generated, or external system generated filter values, and anticipated values for these parameters can be generated through data analytics, artificial intelligence, machine learning and/or neural network methodologies, or a combination of these procedures. These value setpoints can be stored in a database, in processor memory, integrated into the control system 300, or received via external or remote inputs. The system receives inputs from the various instrument devices, or by internal system programs that analyze, manipulate, or transform the instrument value data into new system data that is a system process value.

Figure 2:
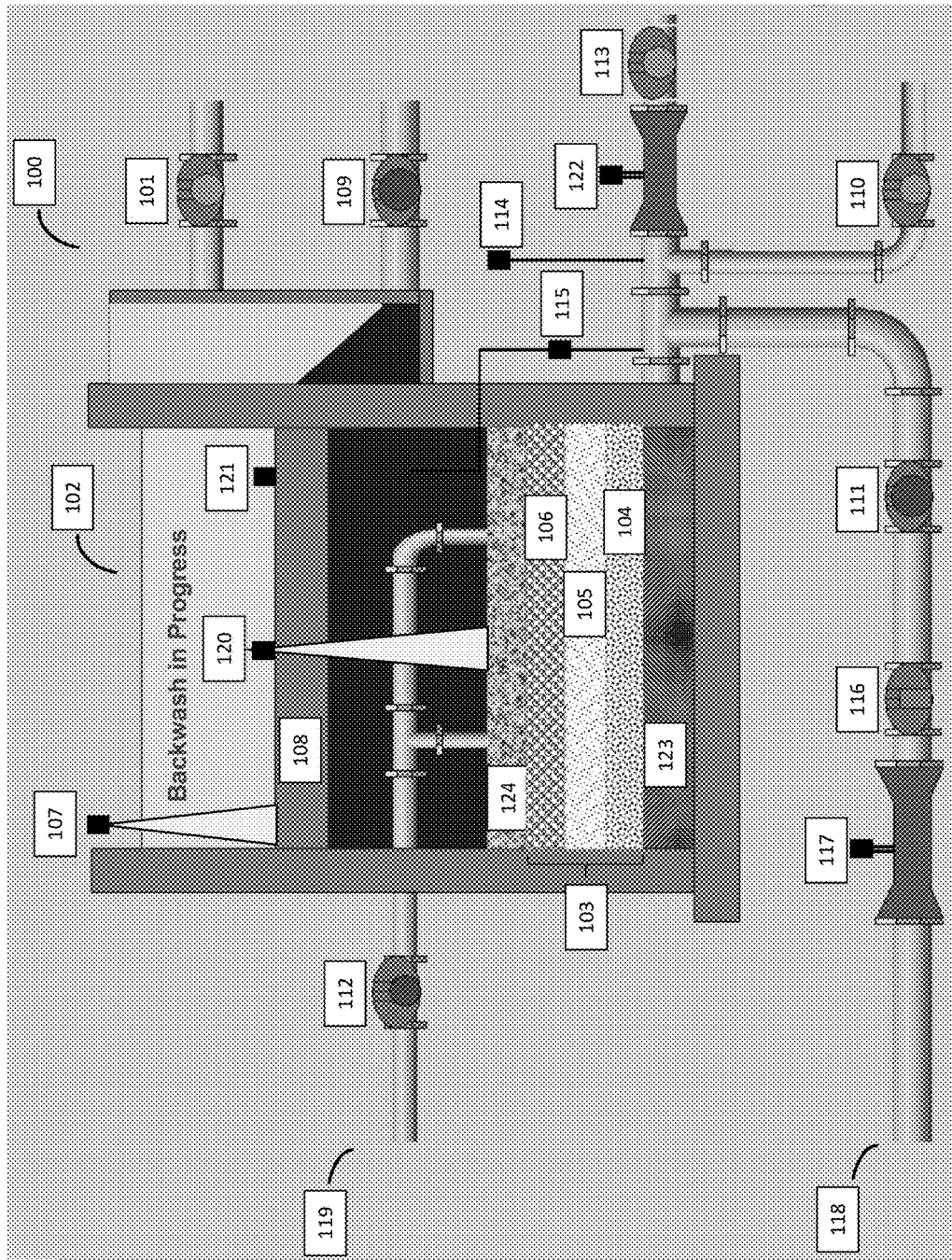
FIG. 2 depicts a water treatment filter system during a filter backwash procedure.

Referring to FIG. 2, as the backwash water flows upward through the media 103, the water level begins to rise and flow over the filter troughs 108, out of the filter 102 through filter drain 109 into a wastewater treatment system. In an embodiment of the present invention, using media level sensor 120, which is installed in filter 102 to allow control system 300 to monitor media bed expansion 124, control system 300 controls the backwash flow rate using backwash supply control valve 116, in order to ensure that the media bed 103 is fluidized or expanded sufficiently to a predetermined level to efficiently clean the media 103, while not over expanding or over fluidizing the media 103 and washing media 103 over the troughs 108 causing the quantity of media 103 in the filter 102 to diminish to insufficient levels over time. In one embodiment, control system 300 controls media bed expansion 124 by predetermined or generated values or setpoints for a high-wash backwash flow setpoint, a rate of media bed expansion, or the media bed expansion value, or a combination of these parameters. In this embodiment, control system 300 adjust the output to the backwash supply control valve 116 to adjust the high-wash backwash flow rate in order to maintain a specific media bed expansion 124 using the foregoing parameters. Because colder water is denser than warmer water and can therefore cause increased media bed expansion 124 for a given flow rate, in a further embodiment of the present invention, control system 300 automatically adjusts the high-wash backwash flow rate to achieve and maintain a specific media bed expansion 124 set point that eliminates any effect of actual water temperature.

In an embodiment of the present invention, backwash water turbidity sensor 121 is installed in the filter box of filter 102 to monitor the filter turbidity and using control system 300, during the high-wash backwash procedure 405 control the termination of the high-wash backwash procedure to ensure that the media 103 is washed sufficiently to a pre-determined backwash turbidity value, typically between 18 and 25 NTU, and not over washed, which results in not only hundreds of thousands of wasted water, but also results in removing necessary seasoning (turbidity) in the media 103 for an efficient return to service and operation of filter 102. The backwash water turbidity sensor 121 also measures settled water turbidity while filter 102 is filtering water. In one embodiment, control system 300 terminates the high-wash backwash procedure 405, when turbidity sensor 121 provides a turbidity value equal to a predetermined or generated setpoint in NTUs that is typically between 18 and 25 NTU. In another embodiment, the control system includes controls that terminate the high-wash backwash procedure 405 by a duration set point if the backwash turbidity sensor 121 fails for any reason, and a longer than anticipated high-wash backwash procedure has elapsed. In this embodiment if the control system 300 terminates the high-wash backwash procedure by the duration set point control, it indicates that there was likely a backwash turbidity sensor 121 failure. In a further aspect, an alarm is triggered through the control system to trigger inspection of the system.

In another embodiment of the present invention, while maintaining a desired media level expansion 124 setpoint, control system 300 terminates the high-wash backwash procedure 405 once the filter backwash turbidity, read by turbidity meter 121, reaches a predetermined or generated setpoint that is designed to minimize the high-wash backwash procedure to ensure that the media 103 is backwashed sufficiently to a pre-determined backwash turbidity value and not over washed below that value which removes necessary seasoning (turbidity) in the media 103 for efficient return to service and operation of filter 102. During this high-wash backwash process 405, the turbidity of the water spikes extremely high due to a phenomenon called a mud-boil. This turbidity spike is extremely high and may be so high that it exceeds the value that is able to be read by turbidimeter 121. However, once the turbidity starts to come down from the increased spike to a predetermined value (e.g., 18 to 25 NTUs, or any other value that has determined to be appropriate for seasoning of the filter media 103 prior to return to service), which can include a delta value from a peak turbidity to calculated change, and can include a specific value that is based on the influent water and a the control system 300 determining the turbidity value, a specific value determined by historical performance of the filter, or any specific value provided by the control system 300, the high-wash backwash procedure is terminated.

Similarly as discussed above in reference to the initial low wash backwash procedure, it is possible that at the time of the high-backwash, the filter media 103 bed is not sufficiently dirty to necessitate higher high-wash flow rates, which if used, could result in over-fluidization of the filter media 103 and loss of filter media 103. Hence, the filter parameters and setpoints for the high-backwash procedure 405 as shown in FIGS. 4 and 5, including the high wash filter backwash turbidity setpoint, can be a variety of measured, control system 300 generated, or external system generated filter values, and anticipated values for these parameters can be generated through data analytics, artificial intelligence, machine learning and/or neural network methodologies, or a combination of these procedures. These value setpoints can be stored in a database, in processor memory, integrated into the control system 300, or received via external or remote inputs. The system receives inputs from the various instrument devices, or by internal system programs that analyze, manipulate, or transform the instrument value data into new system data that is a system process value.

After the high-wash backwash procedure 405 has been completed, control system 300 initiates a second low-wash backwash procedure step 406 to slowly resettle and stratify the media 103 in filter 102 with the anthracite 106 on top of the sand 105. In one embodiment, during this step, the SURFACE WASH valve 112 or the AIR WASH valve 112 remain fully closed, the INFLUENT valve 101, EFFLUENT FLOW CONTROL valve 113 and the FILTER TO WASTE valve 110 remain fully closed and the BACKWASH WASTE valve 109 remains opened. The control system 300 controls the second low-wash backwash flow by monitoring the backwash flow meter 117 measurement or controlling the backwash supply pump 368 using a VFD. Control system 300 uses a predetermined or generated second low-wash backwash flow rate, including a second low-wash backwash flow rate that is designed to reduce the filter media expansion to an acceptable level that represents the resettling of the media 103. In one embodiment, control system 300 terminates the second low-wash backwash after a predetermined or generated elapsed time, a second low-wash backwash total flow has been achieved, or a predetermined or generated acceptable reduced media expansion, or a combination of these parameters. In one embodiment, control system 300 terminates the second low-wash backwash based on the media level as determined by level device 120, as an indicator of the filter media settling. For example, as discussed above, level device 120 can be a multi-electrode capacitance level sensor 20 that is capable of measuring an interface level that provides the level of the media below the overall filter 102 water level. Once control system 300 terminates the second low-wash backwash procedure 406, control system 300 proceeds to return filter 102 to service by initiating the filter-to-waste procedure step 407.

Once the second low-wash backwash procedure 406 is complete, control system 300 initiates the filter-to-waste step 407. In one embodiment, during the filter to waste procedure step 407, the BACKWASH SUPPLY valve 111 is fully closed, the backwash water system is turned off and the BACKWASH WASTE valve 109 is fully closed, the SURFACE WASH 112' or AIR SCOUR valve 112, and the EFFLUENT FLOW CONTROL valve 113 remain fully closed. The INFLUENT valve 101 is fully opened, then the FILTER TO WASTE valve 110 is fully opened to allow the initial return-to-service filtered water to exit the filter to a wastewater treatment system until such time as the effluent turbidity of this water, which is measured by the effluent turbidity meter 114, reaches a pre-determined or generated low turbidity value, usually less than 0.5 NTU acceptable for human consumption or use. In one embodiment, once this effluent turbidity value has been reached, control system 300 terminates the filter-to-waste step 407 by closing FILTER TO WASTE valve 110.

In a further embodiment, once the system 300 terminates the filter-to-waste step 407, the system initiates the filter return to service step 408 as shown in FIGS. 4 and 5, by opening modulating EFFLUENT FLOW CONTROL valve 113 allowing filtered water to go to the clearwell and to consumers for consumption and use.

Similarly as discussed above in reference to the initial low wash backwash procedure 404, and high-wash backwash procedures 405, for the second low-wash backwash procedure 406, filter to waste procedure 407, and filter return to service procedure 408, the filter parameters and setpoints for these procedures 406, 407 and 408, can be a variety of measured, control system 300 generated, or external system generated filter values, and anticipated values for these parameters can be generated through data analytics, artificial intelligence, machine learning and/or neural network methodologies, or a combination of these procedures. These value setpoints can be stored in a database, in processor memory, integrated into the control system 300, or received via external or remote inputs. The system receives inputs from the various instrument devices, or by internal system programs that analyze, manipulate, or transform the instrument value data into new system data that is a system process value.

In another aspect of an embodiment of the present invention, the control system 300 generates output signals to control the various flow control valves and VFDs, using proportional-integral-derivative (PID), proportional, integral or derivative controllers. In another aspect of an embodiment of the present invention, the control system 300 generates output signals that are discrete on/off for valve actuators and pumps and blowers, and also generates output signals that are variable to control valve actuators and VFDs to pumps and blowers.

Figure 7:
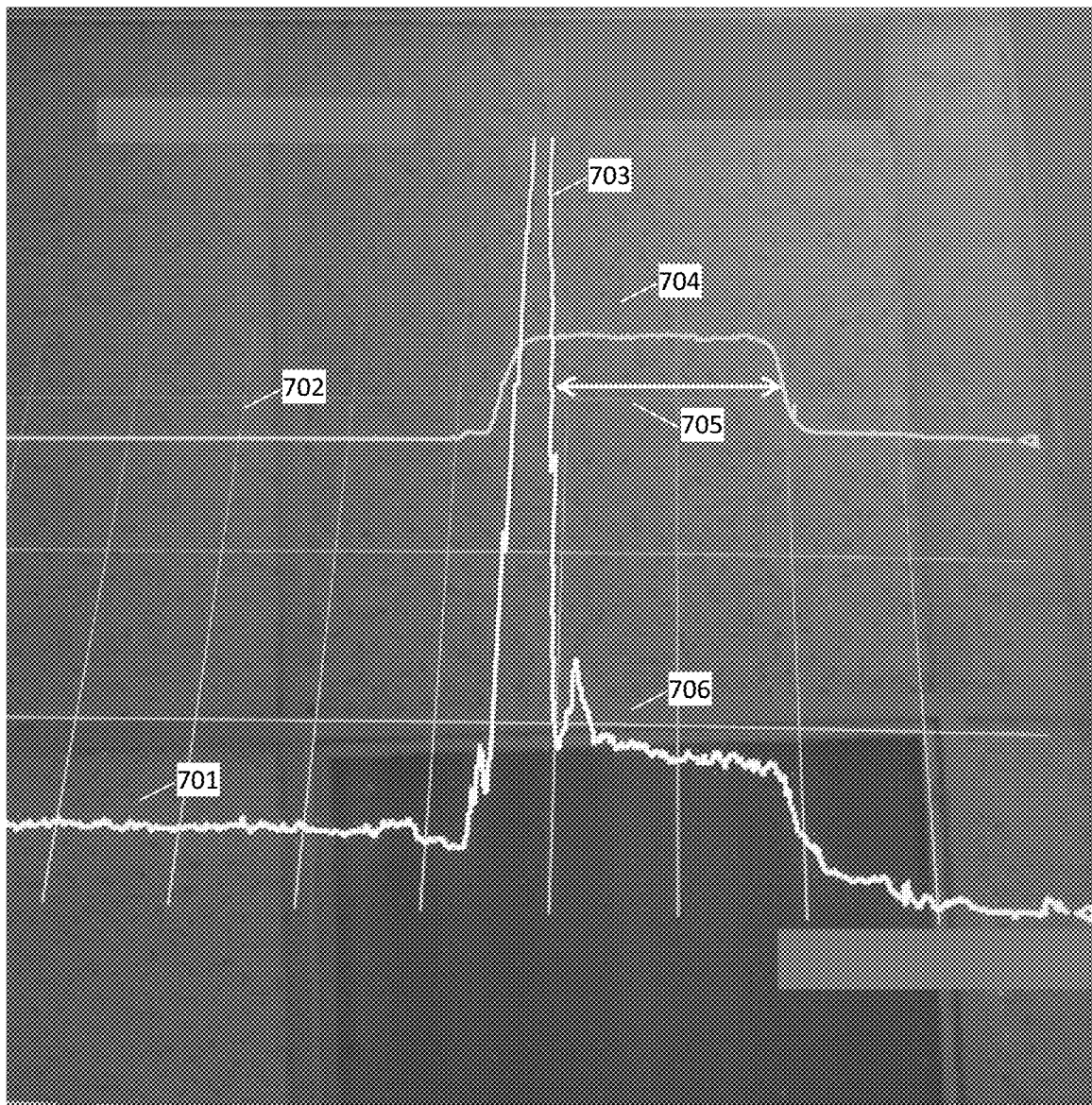
FIG. 7 depicts recorded graphical data of a water treatment filter system during a filter backwash procedure for a plant in Georgia before implementing embodiments of invention described herein.
Figure 8:
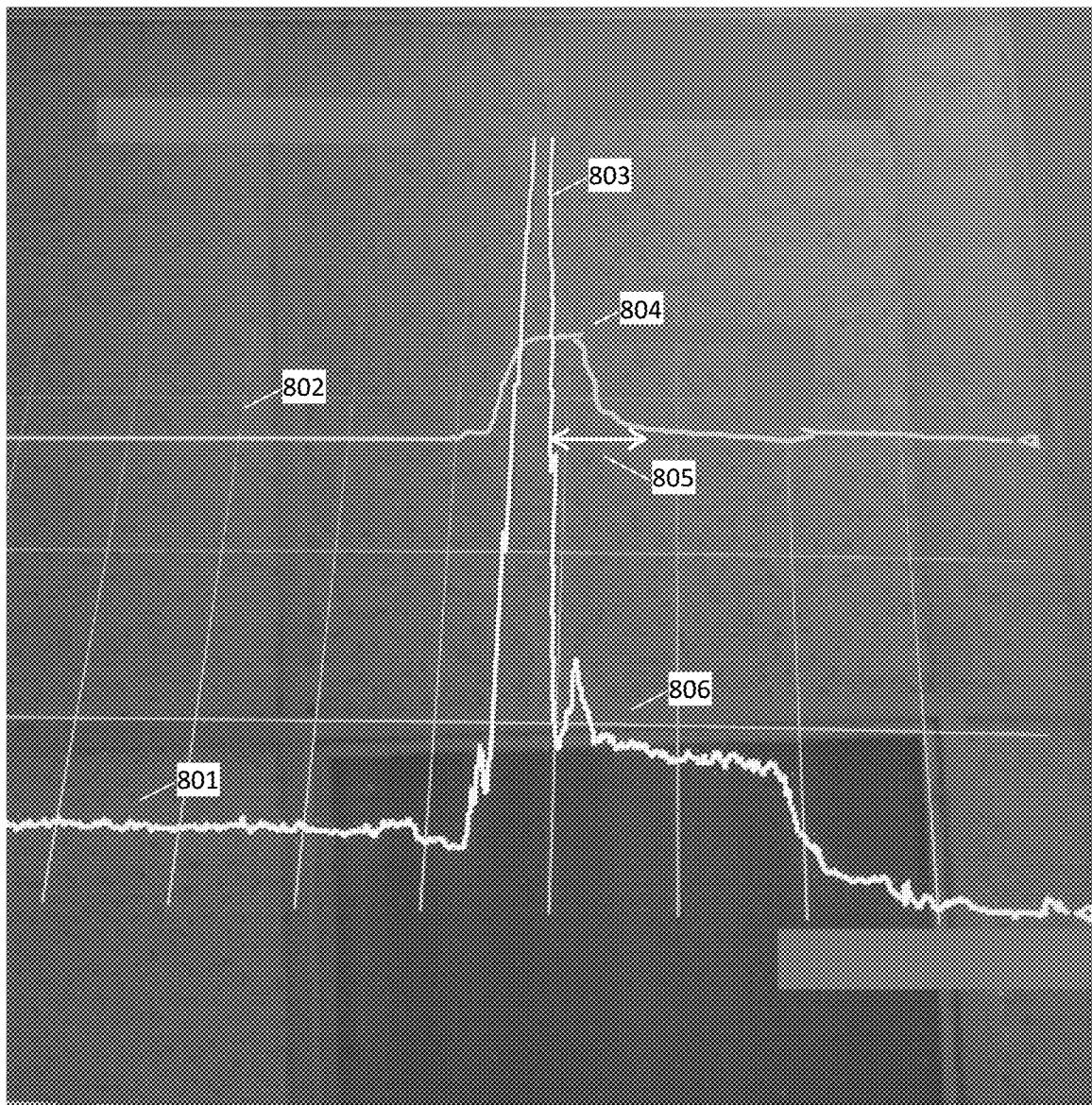
FIG. 8 depicts recorded graphical data of a water treatment filter system during a filter backwash procedure for the Georgia plant identified in FIG. 7 above after implementation of certain embodiments of invention described herein.

The before and after results of an example of a Georgia plant that has implemented certain embodiments of the invention is depicted in FIG. 8. FIG. 7 shows the operation before implementation of certain embodiments of the invention. The green line 701 depicts the filter backwash turbidity before backwash. Orange line 702 depicts the fluid media level before the backwash. 703 depicts the filter backwash turbidity spike during initiation of the high-wash. 704 depicts the media expansion during high wash. 706 depicts the turbidity drop during the high wash. And 705 depicts the 10 minutes of additional time of backwashing, that has been eliminated by certain embodiments of the present invention.

FIG. 8 shows the operation of the Georgia plant after the implementation of certain embodiments of the invention. The green line 801 depicts the filter backwash turbidity before backwash. Orange line 802 depicts the fluid media level before the backwash. 803 depicts the filter backwash turbidity spike during initiation of the high-wash. 804 depicts the media expansion during high wash of about 20%. 806 depicts the turbidity drop during the high wash down to around 20 NTU. And 805 depicts the 3 minutes of backwashing time, and 7 minutes of backwashing time eliminated by certain embodiments of the present invention.

In the Georgia plant, implementation of certain embodiments of the invention resulted in over $150,000 in annual savings to the plant, the elimination of 94,728,000 million of gallons of backwash water wasted ever year, and the elimination of a lagoon holding area for excess backwash waste water before reduced time for the high wash saved. Additionally, the effluent turbidity spike and filter to waste after filter backwash and placing filter back in service was virtually eliminated using certain embodiments of the invention.

In another aspect of an embodiment of the invention, a Gravity Filter System Enhanced Performance, Optimization, Modeling & Intelligent Data Manipulation and Analysis Tool is implanted using data analytics, artificial intelligence, machine learning and/or neural network methodologies to: predict the subject, a related, or an unrelated filter's performance and/or operational setpoints; generate benchmarking metrics for filter systems' operation and maintenance; and/or generate setpoints and anticipated measurement and filter operational values. It provides:

Filter System Health Analysis System
    Filter Media Loss & Health
        Continuously monitor and trend media level, media bed expansion level and media loss
        Alarm when media bed level fall below mandated level requirements
        Analyze media level and bed expansion over time compared with varying flow rates
        Analyze variations in media bed expansion based on water quality conditions and temperature variations
    Filter System Water & Wastewater Use
        Continuously monitor and trend quantity of water used in filters while making water, during backwashes & wastewater
        Alarm when variations in flow quantities, durations or runtimes exceed preset limits
        Analyze variations in water quantities used in filtering and backwash process over time to identify potential tuning adjustments for better performance, enhanced filter runtimes and efficient backwashes with minimal waste of water
    Maintenance & Service Requirements for Filter System
        Continuously monitor and trend equipment and process runtimes
        Automatically generate maintenance and service work orders
        Instrumentation calibration
        Valve actuator maintenance
        Backwash pump and blower system maintenance
        Periodic laboratory water quality and media analysis Although the apparatuses and methods described herein have been described in detail, it should be understood that various changes, substitutions, and alterations can be made without departing from the spirit and scope of the invention as defined by the following claims. Those skilled in the art may be able to study the exemplar embodiments and identify other ways to practice the invention that are not exactly as described herein. It is the intent of the inventor that variations and equivalents of the invention are within the scope of the claims while the description, abstract and drawings are not to be used to limit the scope of the invention. The invention is specifically intended to be as broad as the claims below and their equivalents.

What is claimed is:

1. A water filter control system for use in a water treatment system, comprising: a control system programmed to monitor measurement instrumentation and control the opening and closing of a plurality of valves;
a plurality of valves connected to the control system;
measurement instrumentation connected to the control system, the measurement instrumentation having an electronic interface, the measurement instrumentation including a level device that measures a filter media level and a turbidity meter that measures a filter bed turbidity; and
wherein the control system monitors and controls the opening and closing of the plurality of valves and monitors the filter backwash turbidity within the filter and tests the measurement instrumentation within the filter in order to maintain a desired filter media bed expansion based on a filter media level set point and control a backwash inlet liquid flow, based on a filter backwash turbidity set point.

2. The water filter control system of claim 1, wherein the plurality of valves is coupled to a plurality of actuators and the actuators are in communication with the control system.

3. The water filter control system of claim 2, wherein the plurality of actuators of actuators are pneumatic actuators.

4. The water filter control system of claim 3, wherein the plurality of actuators are vane-type or cylinder-type pneumatic actuators.

5. The water filter control system of claim 2, wherein the plurality of actuators are hydraulic actuators.

6. The water filter control system of claim 2, wherein the plurality of actuators are electric actuators.

7. The water filter control system of claim 2, wherein the plurality of actuators is connected to the control system with a wired connection.

8. The water filter control system of claim 2, wherein the plurality of actuators is connected to the control system with a wireless connection.

9. The water filter control system of claim 1, wherein the measurement instrumentation is connected to the control system with a wired connection.

10. The water filter control system of claim 1, wherein the measurement instrumentation is connected to the control system with a wireless connection.

11. The water filter control system of claim 1, wherein the control system comprises a programmable logic controller.

* * * * *